US009992636B2

(12) United States Patent
Hamada

(10) Patent No.: US 9,992,636 B2
(45) Date of Patent: *Jun. 5, 2018

(54) TRANSMISSION MANAGEMENT SYSTEM, MANAGEMENT METHOD, AND RECORDING MEDIUM

(71) Applicant: RICOH COMPANY, LTD., Tokyo (JP)

(72) Inventor: Yuuta Hamada, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 628 days.

This patent is subject to a terminal disclaimer.

(21) Appl. No.: 14/502,119

(22) Filed: Sep. 30, 2014

(65) Prior Publication Data

US 2015/0094049 A1   Apr. 2, 2015

(30) Foreign Application Priority Data

Sep. 30, 2013  (JP) .................................. 2013-205305

(51) Int. Cl.
*H04W 4/08* (2009.01)
*H04L 12/18* (2006.01)
(Continued)

(52) U.S. Cl.
CPC ........... *H04W 4/08* (2013.01); *H04L 12/1822* (2013.01); *H04L 63/102* (2013.01);
(Continued)

(58) Field of Classification Search
CPC .... H04W 4/08; H04W 60/00; H04L 12/1822; H04L 65/1093; H04L 65/4038;
(Continued)

(56) References Cited

U.S. PATENT DOCUMENTS

2003/0079037 A1   4/2003  Donnelly et al.
2004/0131042 A1*  7/2004  Lillie .................. H04L 12/1822
                                                           370/351
(Continued)

FOREIGN PATENT DOCUMENTS

JP    2006-074453      3/2006
JP    2013-085208      5/2013
WO    WO 2012/074124 A1   6/2012

OTHER PUBLICATIONS

Extended European Search Report dated Feb. 11, 2015 in Application No. 14187030.3.

*Primary Examiner* — Joseph Dean, Jr.
(74) *Attorney, Agent, or Firm* — Oblon, McClelland, Maier & Neustadt, L.L.P.

(57) ABSTRACT

A transmission management system, in response to receiving a registration request for registering a candidate counterpart terminal in a candidate list of a first transmission terminal, determines whether a target of the registration request is a second transmission terminal or a group. The management system transmits, to the second transmission terminal, an approval request for requesting whether to approve registering the second transmission terminal as a candidate counterpart terminal in the candidate list of the first transmission terminal, when the target of the registration request is determined to be the second transmission terminal. The management system transmits, to an administrator terminal operated by an administrator of the group, an approval request for requesting whether to approve registering all transmission terminals in the group as candidate counterpart terminals in the candidate list of the first transmission terminal, when the target of the registration request is determined to be the group.

9 Claims, 22 Drawing Sheets

(51) Int. Cl.
*H04W 60/00* (2009.01)
*H04L 29/06* (2006.01)
*H04M 3/56* (2006.01)
*H04M 3/493* (2006.01)
*H04L 29/08* (2006.01)

(52) U.S. Cl.
CPC ........ *H04L 65/1093* (2013.01); *H04L 65/403* (2013.01); *H04L 65/4038* (2013.01); *H04W 60/00* (2013.01); *H04L 67/1044* (2013.01); *H04M 3/4931* (2013.01); *H04M 3/563* (2013.01); *H04M 3/567* (2013.01); *H04M 2203/6009* (2013.01)

(58) Field of Classification Search
CPC . H04L 63/102; H04L 65/403; H04L 67/1044; H04M 3/563; H04M 2203/6009; H04M 3/4931; H04M 3/567
See application file for complete search history.

(56) References Cited

U.S. PATENT DOCUMENTS

2007/0100944 A1    5/2007  Ford et al.
2012/0221702 A1*   8/2012  Umehara ............ H04L 12/1818
                                                            709/223

* cited by examiner

LOW RESOLUTION

INTERMEDIATE RESOLUTION

HIGH RESOLUTION

FIG. 8

| TERMINAL ID | PASSWORD |
|---|---|
| 01aa | aaaa |
| 01ab | abab |
| 01ac | acac |
| ... | ... |

FIG. 9

| TERMINAL ID | NAME | OPERATION STATE | DATE/TIME RECEIVED | IP ADDRESS |
|---|---|---|---|---|
| 01aa | AA TERMINAL | ONLINE (COMMUNICATION OK) | 2012.08.20.13:40 | 1.2.1.3 |
| 01ab | AB TERMINAL | OFFLINE | 2012.08.19.12:00 | 1.2.1.4 |
| ... | ... | ... | ... | ... |
| 01ba | BA TERMINAL | ONLINE (INTERRUPT) | 2012.08.20.13:45 | 1.2.2.3 |
| 01bb | BB TERMINAL | ONLINE (COMMUNICATION OK) | 2012.08.20.13:50 | 1.2.2.4 |
| ... | ... | ... | ... | ... |
| 01ca | CA TERMINAL | OFFLINE | 2012.08.20.12:45 | 1.3.1.3 |
| 01cb | CB TERMINAL | ONLINE (COMMUNICATING) | 2012.08.20.13:55 | 1.3.1.4 |
| ... | ... | ... | ... | ... |
| 01da | DA TERMINAL | ONLINE (COMMUNICATING) | 2012.08.18.12:45 | 1.3.2.3 |
| 01db | DB TERMINAL | ONLINE (COMMUNICATION OK) | 2012.08.20.12:45 | 1.3.2.4 |
| ... | ... | ... | ... | ... |

FIG. 10

| STARTING TERMINAL ID | CANDIDATE COUNTERPART TERMINAL ID |
|---|---|
| 01aa | 01ab, ..., 01ba, 01bb, ..., 01ca, 01cb |
| 01ab | 01aa, 01ca, 01cb |
| 01ba | 01aa, 01ab, 01ca, 01cb, 01da, 01db |
| ... | ... |

FIG. 11

| TERMINAL ID/GROUP ID OF REQUEST SENDER | TERMINAL ID/GROUP ID OF REQUEST DESTINATION |
|---|---|
| 01ca | 01da |
| G001 | 01da |
| G001 | G004 |

FIG. 12

| ADMINISTRATOR ID | PASSWORD | GROUP ID |
|---|---|---|
| 02A | AAAA | G001, G002 |
| 02B | BBBB | G003 |
| 02D | DDDD | G004 |

FIG. 13

| GROUP ID | GROUP NAME | MANAGEMENT TERMINAL ID |
|---|---|---|
| G001 | FIRST SALES DIVISION | 01aa, 01ab |
| G002 | SECOND SALES DIVISION | 01ba, 01bb, 01bc |
| G003 | FIRST DEVELOPMENT DIVISION | 01ca, 01cb, 01cc |
| G004 | SECOND DEVELOPMENT DIVISION | 01da, 01db, 01dc |

FIG. 18

○ TERMINAL AUTHENTICATION:

TERMINAL ID [          ]

PASSWORD [          ]

[LOGIN]

● ADMINISTRATOR AUTHENTICATION:

ADMINISTRATOR ID [          ]

PASSWORD [          ]

[NEW REGISTRATION] [LOGIN]

FIG. 19

ADMINISTRATOR REGISTRATION:

ADMINISTRATOR ID [          ]

PASSWORD [          ]

PASSWORD (CONFIRM) [          ]

[REGISTER] [CANCEL]

FIG. 22

MANAGEMENT TERMINAL REGISTRATION:

MANAGEMENT TERMINAL GROUP ▼
- FIRST SALES DIVISION
- SECOND SALES DIVISION
- FIRST DEVELOPMENT DIVISION
- SECOND DEVELOPMENT DIVISION

REGISTRATION TERMINAL ID [          ]
REGISTRATION TERMINAL ID [          ]
REGISTRATION TERMINAL ID [          ]

[REGISTER] [CANCEL]

FIG. 23

CONFIRMATION FOR GROUP DELETION:

The following group will be deleted. OK?

GROUP ID: G001
GROUP NAME: FIRST SALES DIVISION

[OK] [CANCEL]

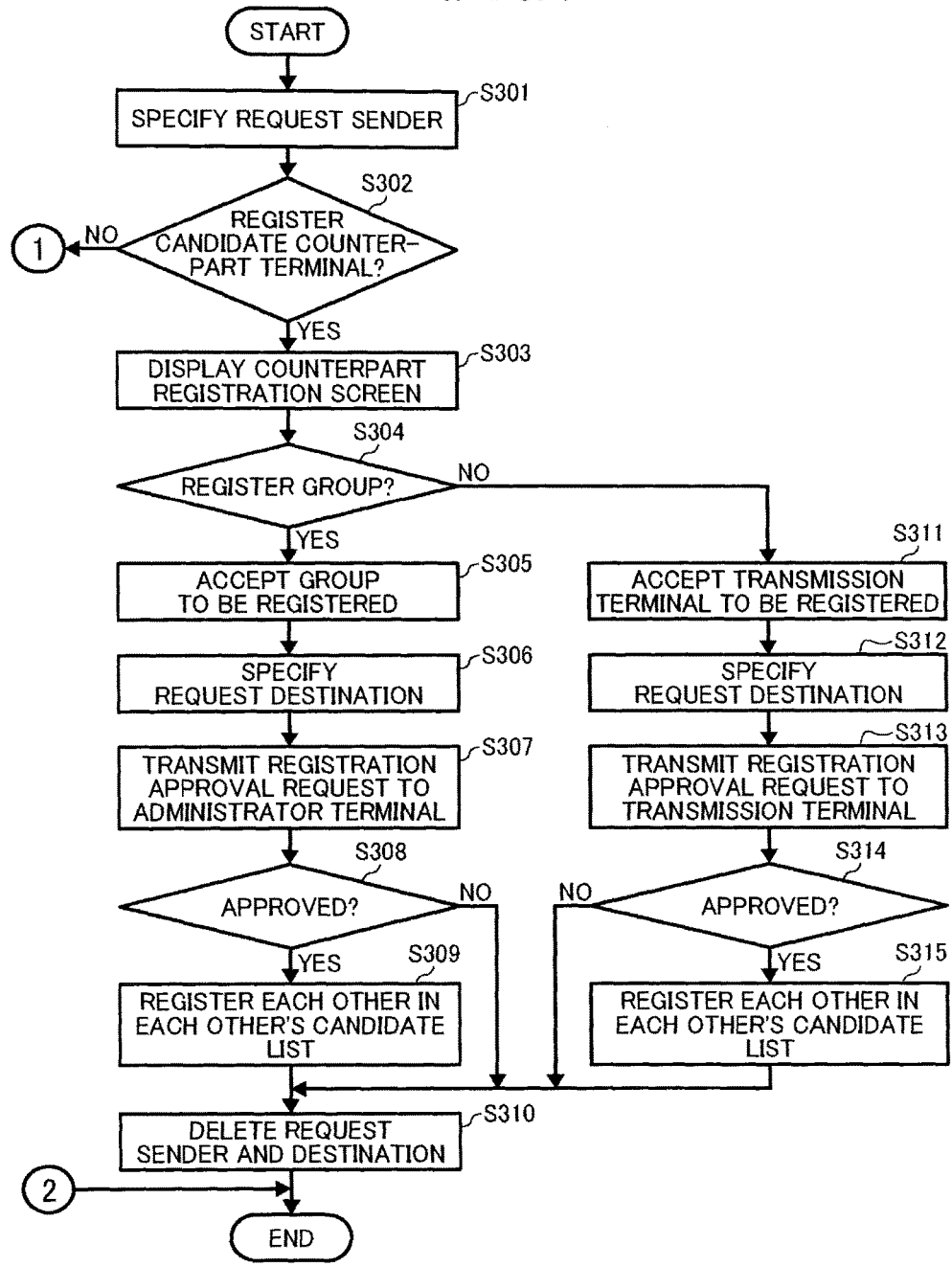

FIG. 26

COUNTERPART REGISTRATION FROM
"FIRST SALES DIVISION" GROUP:

⦿ COUNTERPART REGISTRATION REQUEST
   FOR TERMINAL:

REQUEST DESTINATION TERMINAL ID [          ]
REQUEST DESTINATION TERMINAL ID [          ]
REQUEST DESTINATION TERMINAL ID [          ]

○ COUNTERPART REGISTRATION REQUEST FOR GROUP:

REQUEST DESTINATION GROUP ID [          ]
REQUEST DESTINATION GROUP ID [          ]
REQUEST DESTINATION GROUP ID [          ]

[TRANSMIT] [CANCEL]

FIG. 27

COUNTERPART DELETION FROM
"FIRST SALES DIVISION" GROUP:

⦿ COUNTERPART DELETION REQUEST FOR TERMINAL:

REQUEST DESTINATION TERMINAL ID [                    ]
REQUEST DESTINATION TERMINAL ID [                    ]
REQUEST DESTINATION TERMINAL ID [                    ]

○ COUNTERPART DELETION REQUEST FOR GROUP:

REQUEST DESTINATION GROUP ID [                    ]
REQUEST DESTINATION GROUP ID [                    ]
REQUEST DESTINATION GROUP ID [                    ]

[TRANSMIT] [CANCEL]

FIG. 28

APPROVAL REQUEST FOR COUNTERPART REGISTRATION:

A request for registering all terminals in "Second Development Division" under your management as candidate counterpart terminals in the candidate list of "AA terminal" has been received.
Do you give approval?

[YES] [NO]

TRANSMISSION MANAGEMENT SYSTEM, MANAGEMENT METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2013-205305, filed on Sep. 30, 2013, in the Japan Patent Office, the entire disclosure of which is hereby incorporated by reference herein.

BACKGROUND

Technical Field

The present invention relates to managing information regarding counterpart terminals.

Description of the Related Art

Transmission systems that perform a videoconference or the like via a communication network such as the Internet have become popular in recent years due to a demand for reducing business trip costs and time. In such a transmission system, once communication between or among a plurality of transmission terminals starts, image data and audio data are transmitted and received, thereby realizing a videoconference.

In order to make it easier for a user to select a desired counterpart terminal from among candidate counterpart terminals for communication, a candidate list may be displayed at a starting terminal that requests to start communication, thus allowing the user to select a desired counterpart terminal, for example, as described in JP-2006-074453-A.

Further, as described in JP-2013-085208-A, in the case where a user wants to register a candidate counterpart terminal in his/her candidate list, the user at a terminal sends an approval request, via a management server that manages the candidate list, to ask a communication partner at the candidate counterpart terminal whether it is permitted to register the terminal of the communication partner to the user's candidate list as a candidate counterpart terminal. If an approval to register the candidate counterpart terminal is obtained from the communication partner, the candidate counterpart terminal is registered.

If there is a plurality of candidate counterpart terminals to be registered, an approval request is sent to each one of the terminals of the communication partners, thus increasing the processing load on the system.

SUMMARY

Example embodiments of the present invention include a transmission management system, which, in response to receiving a registration request for registering a candidate counterpart terminal in a candidate list of a first transmission terminal, determines whether a target of the registration request is a second transmission terminal or a group. The management system transmits, to the second transmission terminal, an approval request for requesting whether to approve registering the second transmission terminal as a candidate counterpart terminal in the candidate list of the first transmission terminal, when the target of the registration request is determined to be the second transmission terminal. The management system transmits, to an administrator terminal operated by an administrator of the group, an approval request for requesting whether to approve registering all transmission terminals in the group as candidate counterpart terminals in the candidate list of the first transmission terminal, when the target of the registration request is determined to be the group.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 8 is a conceptual diagram of a terminal authentication management database (DB);

FIG. 9 is a conceptual diagram of a terminal management DB;

FIG. 10 is a conceptual diagram of a candidate list management DB;

FIG. 11 is a conceptual diagram of a request management DB;

FIG. 12 is a conceptual diagram of an administrator DB;

FIG. 13 is a conceptual diagram of a group management DB;

FIG. 18 is a conceptual diagram of an authentication screen;

FIG. 19 is a diagram illustrating an administrator registration screen;

FIG. 22 is a conceptual diagram of a management terminal registration screen;

FIG. 23 illustrates a confirmation screen for group deletion;

FIGS. 25A and 25B (FIG. 25) are a flowchart illustrating a candidate counterpart terminal registration and deletion process;

FIG. 26 is a conceptual diagram of a candidate counterpart terminal registration screen;

FIG. 27 is a conceptual diagram of a candidate counterpart terminal deletion screen; and FIG. 28 is a conceptual diagram of a counterpart registration approval requesting screen.

Figure 1:
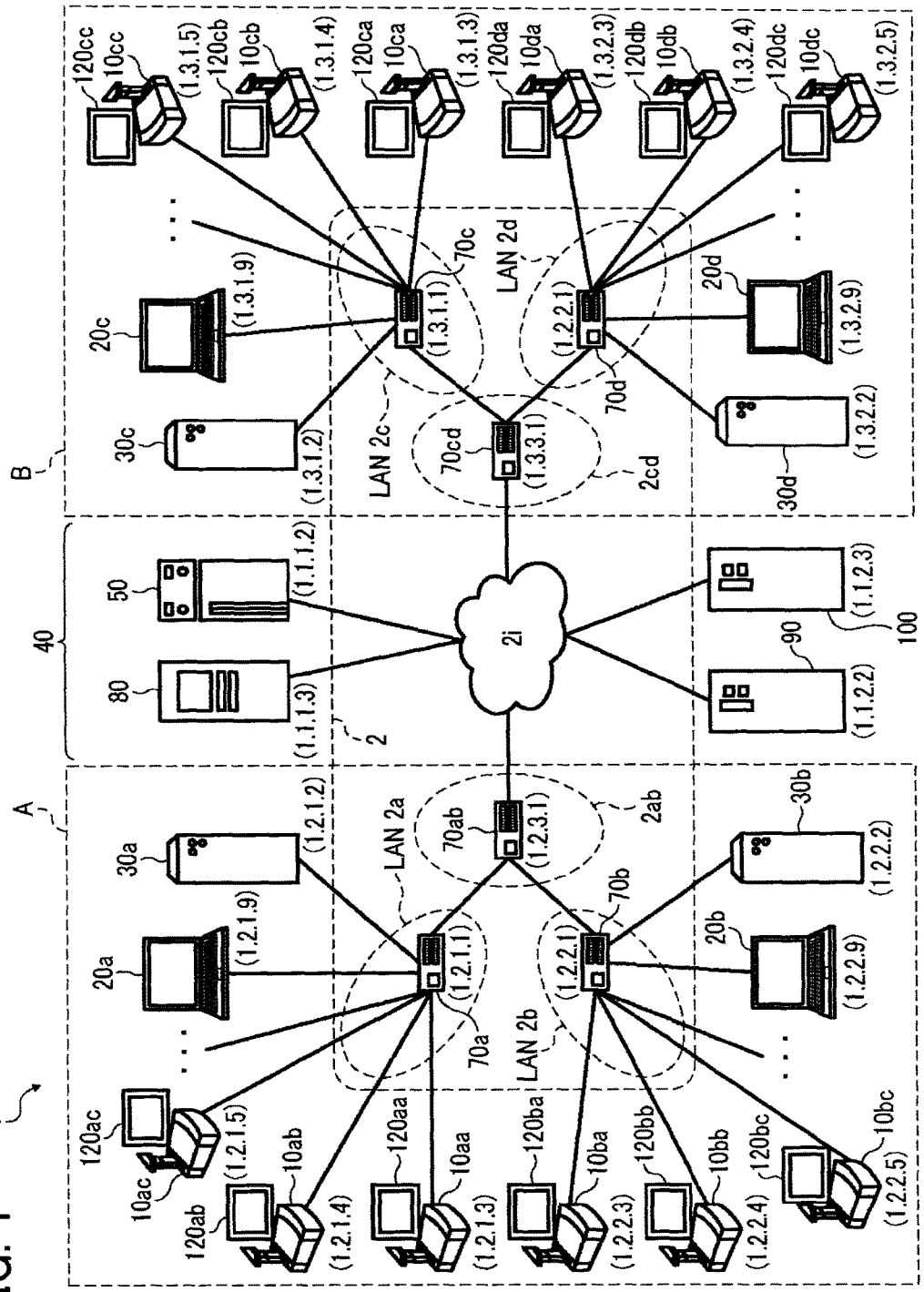
FIG. 1 is a schematic diagram of a transmission system according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Hereinafter, a transmission system 1 according to an embodiment of the present invention will be described referring to the drawings.

In this example, the transmission system 1 is implemented as a communication system that intercommunicates information, information that reflects feelings, or the like between or among a plurality terminals. The communication system is a system for intercommunicating information, information that reflects feelings, or the like between a plurality of communication terminals (corresponding to "transmission terminals" in the embodiment) via a communication management system (corresponding to a "transmission management system"), and examples thereof include a teleconference system and a video conference system.

<Overall Configuration>

Figure 2:
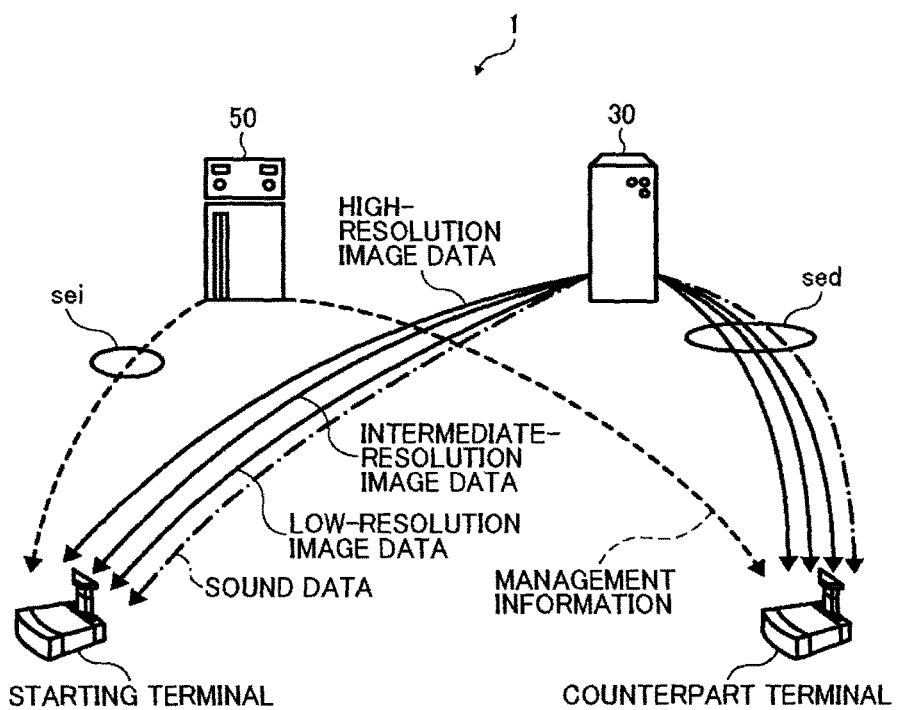
FIG. 2 is a conceptual diagram illustrating a transmission/reception of image data, sound data, and various types of management information in the transmission system.
Figure 3A:
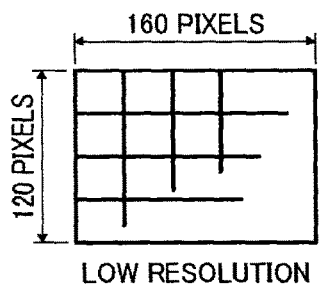
FIGS. 3A to 3C are conceptual diagrams describing the image quality of image data.
Figure 3B:
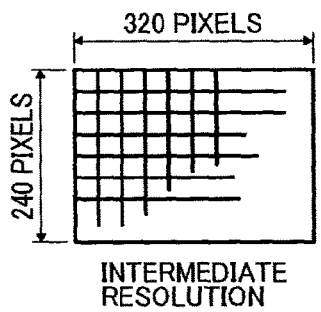
Figure 3C:
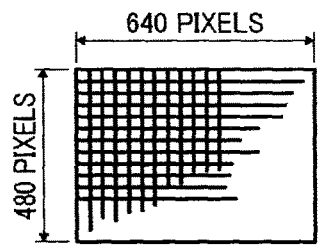

Next, the overall configuration of the embodiment will be described. FIG. 1 is a schematic diagram of a transmission system according to the embodiment of the present invention. FIG. 2 is a conceptual diagram illustrating a transmission/reception of image data, sound data, and various types of management information in the transmission system. FIGS. 3A to 3C are conceptual diagrams describing the image quality of image data.

The transmission system 1 illustrated in FIG. 1 includes a plurality of transmission terminals (10aa, 10ab, . . . ), displays (120aa, 120ab, . . . ) provided for the respective transmission terminals (10aa, 10ab, . . . ), a plurality of administrator terminals (20a, 20b, 20c, and 20d), a plurality of relay devices (30a, 30b, 30c, and 30d), a transmission management system 40, a program providing system 90, and a maintenance system 100. Further, the transmission management system 40 includes a terminal management system 50 and a counterpart registration system 80.

The plurality of transmission terminals 10 transmit or receive image data and sound data serving as examples of content data. Note that another example of content data includes text data. In addition, it is sufficient for content data to include at least one of image data, sound data, and text data.

Hereinafter, an arbitrary one or ones of the plurality of transmission terminals (10aa, 10ab, . . . ) is/are represented as a "transmission terminal(s) 10", an arbitrary one or ones of the plurality of displays (120aa, 120ab, . . . ) is/are represented as a "display(s) 120", and an arbitrary one or ones of the plurality of relay devices (30a, 30b, 30c, and 30d) is/are represented as a "relay device(s) 30".

In addition, hereinafter, a transmission terminal 10 serving as a request sender that gives a request to start a videoconference or the like is represented as a "starting terminal", and a transmission terminal 10 serving as a counterpart terminal (relay destination) that is a request destination is represented as a "counterpart terminal". Further, a transmission terminal 10 that gives a request to register another transmission terminal 10 serving as a communication partner, namely, a counterpart, in a candidate list of the transmission terminal 10 is represented as a "request sender terminal", and this other transmission terminal 10 serving as a communication partner in this case is represented as a "request destination terminal".

In addition, as illustrated in FIG. 2, a management information session sei for transmitting and receiving various types of management information is established via the terminal management system 50 between a starting terminal and a counterpart terminal in the transmission system 1. In addition, four sessions for transmitting and receiving four items of data, namely, high-resolution image data, intermediate-resolution image data, low-resolution image data, and sound data, are established via a relay device 30 between the starting terminal and the counterpart terminal. Here, these four sessions are collectively indicated as an image/sound data session sed. Note that it is not always necessary to have the relay device 30 between the starting terminal and the counterpart terminal; the image/sound data session sed may be established directly between the starting terminal and the counterpart terminal.

Here, the resolution of images of image data handled in the embodiment will be described. There are the following images: a low-resolution image, serving as a base image, having horizontal 160 pixels by vertical 120 pixels, as illustrated in FIG. 3A; an intermediate-resolution image having horizontal 320 pixels by vertical 240 pixels, as illustrated in FIG. 3B; and a high-resolution image having horizontal 640 pixels by vertical 480 pixels, as illustrated in FIG. 3C. In the case of transmitting via a narrowband path, low-quality image data that only includes low-resolution image data serving as a base image is relayed. In the case of transmitting via a relatively wide band, intermediate-quality image data including low-resolution image data serving as a base image and intermediate-resolution image data is relayed. In addition, in the case of transmitting via a very wide band, high-quality image data including low-resolution image data serving as a base image, intermediate-resolution image data, and high-resolution image data is relayed.

The relay devices 30 illustrated in FIG. 1 relay content data between the plurality of transmission terminals 10. The terminal management system 50 collectively manages login authentication from the transmission terminals 10, the communication states, candidate lists, and so forth of the transmission terminals 10, and the communication states and so forth of the relay devices 30. Note that an image of image data may be a moving image or a still image, or may include both thereof.

A plurality of routers (70a, 70b, 70c, 70d, 70ab, and 70cd) select an optimal path for image data and sound data. Hereinafter, an arbitrary one or ones of the routers (70a, 70b, 70c, 70d, 70ab, and 70cd) is/are represented as a "router(s) 70".

The program providing system 90 includes a hard disk (HD) 204 described later. The HD 204 stores a transmission terminal program for causing a transmission terminal 10 to realize various functions (or for causing a transmission terminal 10 to function as various elements), and the transmission terminal program can be transmitted to the transmission terminal 10. In addition, the HD 204 of the program providing system 90 stores a relay device program for causing a relay device 30 to realize various functions (or for causing a relay device 30 to function as various elements), and the relay device program can be transmitted to the relay device 30.

Further, the HD 204 of the program providing system 90 stores a terminal management program for causing the terminal management system 50 to realize various functions (or for causing the terminal management system 50 to function as various elements), and the terminal management program can be transmitted to the terminal management system 50. In addition, the HD 204 of the program providing system 90 stores a counterpart registration program for causing the counterpart registration system 80 to realize various functions (or for causing the counterpart registration system 80 to function as various elements), and the counterpart registration program can be transmitted to the counterpart registration system 80. Note that the terminal management program and the counterpart registration program may be collectively referred to as a transmission management program.

The maintenance system 100 may be implemented by one or more computers for performing maintenance, management, or conservation of at least one of the transmission terminals 10, the relay devices 30, the terminal management system 50, the counterpart registration system 80, and the program providing system 90. For example, in the case where the maintenance system 100 is located in one country, and the transmission terminals 10, the relay devices 30, the terminal management system 50, the counterpart registration system 80, or the program providing system 90 is/are located outside that country, the maintenance system 100 remotely performs, via a communication network 2, maintenance, management, or conservation of at least one of the transmission terminals 10, the relay devices 30, the terminal management system 50, the counterpart registration system 80, and the program providing system 90. In addition, the maintenance system 100 performs maintenance such as management of the model number, serial number, sales contact, maintenance checkup, or a past history of failures of at least one of the transmission terminals 10, the relay devices 30, the terminal management system 50, the counterpart registration system 80, and the program providing system 90 without having the communication network 2 therebetween.

The transmission terminals (10aa, 10ab, 10ac, . . . ), the relay device 30a, and the router 70a are connected to be communicable with each other by a local area network (LAN) 2a. The transmission terminals (10ba, 10bb, 10bc, . . . ), the relay device 30b, and the router 70b are connected to be communicable with each other by a LAN 2b. In addition, the LAN 2a and the LAN 2b are connected to be communicable with each other by a dedicated line 2ab including the router 70ab and are configured in a certain area A. For example, assuming that the area A is an office in Tokyo, the LAN 2a is configured in the first sales division, and the LAN 2b is configured in the second sales division.

The transmission terminals (10ca, 10cb, 10cc, . . . ), the relay device 30c, and the router 70c are connected to be communicable with each other by a LAN 2c. The transmission terminals (10da, 10db, 10dc, . . . ), the relay device 30d, and the router 70d are connected to be communicable with each other by a LAN 2d. In addition, the LAN 2c and the LAN 2d are connected to be communicable with each other by a dedicated line 2cd including the router 70cd and are configured in a certain area B. For example, assuming that the area B is an office in Osaka, the LAN 2c is configured in the first development division, and the LAN 2d is configured in the second development division. The area A and the area B are connected to be communicable with each other via the routers (70ab and 70cd), respectively, via the Internet 2i.

In addition, the terminal management system 50, the counterpart registration system 80, and the program providing system 90 are connected to be communicable with the transmission terminals 10 and the relay devices 30 via the Internet 2i. The terminal management system 50, the counterpart registration system 80, and the program providing system 90 may be located in the area A or the area B, or may be located in other areas.

In the embodiment, the communication network 2 of the embodiment includes the LAN 2a, the LAN 2b, the dedicated line 2ab, the Internet 2i, the dedicated line 2cd, the LAN 2c, and the LAN 2d. The communication network 2 may include not only a wired network, but also a wireless network where communication is performed wirelessly, such as Wireless Fidelity (WiFi) or Bluetooth (registered trademark).

In FIG. 1, four digits indicated below each of the transmission terminals 10, each of the relay devices 30, the terminal management system 50, each of the routers 70, the counterpart registration system 80, and the program providing system 90 indicates an IP address in an abbreviated form in the general Internet Protocol version 4 (IPv4). For example, the IP address of the transmission terminal 10aa is "1. 2. 1. 3". Although IPv6 may be used instead of IPv4, IPv4 is used in order to make the description simple.

Note that the transmission terminals 10 may be used not only for communication between offices or between different rooms in the same office, but also for communication within the same room or for outdoor-indoor communication or outdoor-outdoor communication. In the case where the transmission terminals 10 are used outside, wireless communication using a cellular phone communication network or the like is performed.

<Hardware Configuration>

Figure 4:
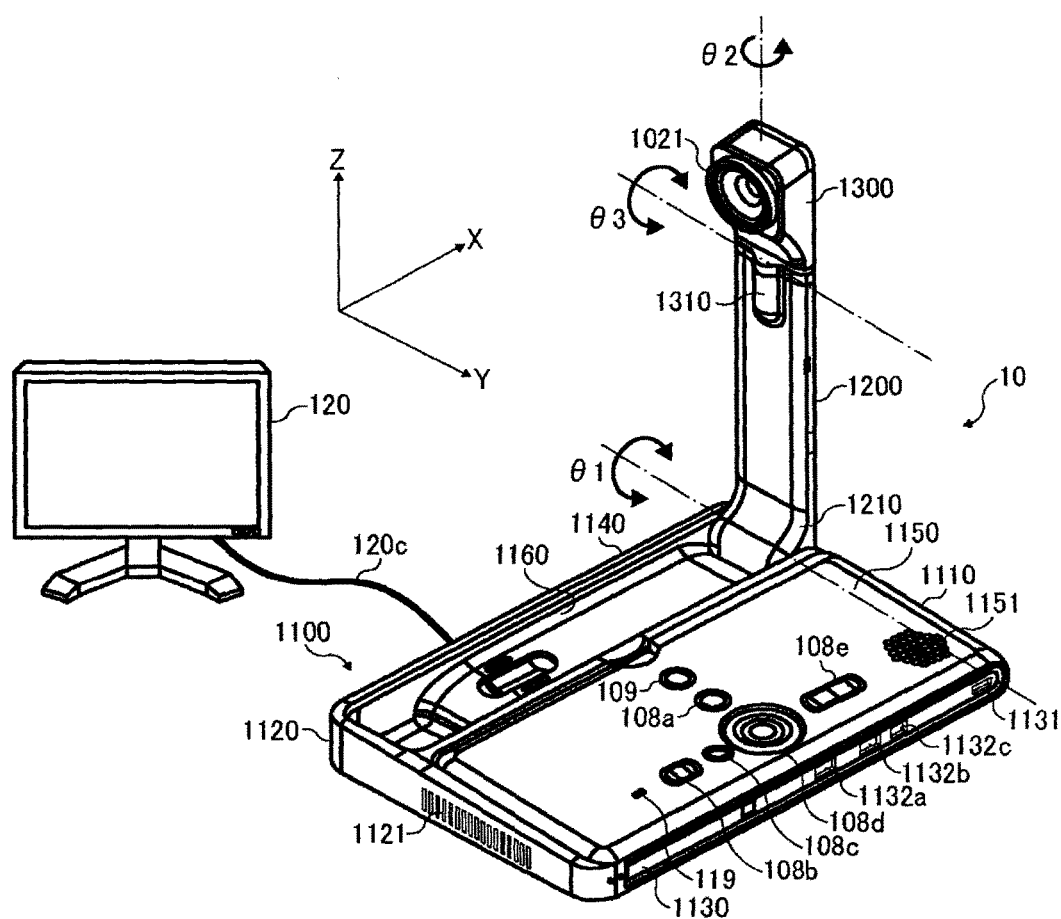
FIG. 4 is an external view of a transmission terminal of the transmission system of FIG. 1.

Next, referring to FIGS. 4 to 6, the hardware configuration of the embodiment will be described. FIG. 4 is an external view of the transmission terminal 10. The description will be given assuming that the longitudinal direction of the transmission terminal 10 is the X-axis direction, a direction orthogonal to the X-axis direction on one plane is the Y-axis direction, and a direction orthogonal to the X-axis direction and the Y-axis direction (vertical direction) is the Z-axis direction.

As illustrated in FIG. 4, the transmission terminal 10 includes a casing 1100, an arm 1200, and a camera housing 1300. Among these portions, a front wall 1110 of the casing 1100 has an inlet face including a plurality of inlet holes, and a back wall 1120 of the casing 1100 has an exhaust face 1121 on which a plurality of exhaust holes are formed. Accordingly, by driving of a cooling fan included in the casing 1100, air behind the transmission terminal 10 can be taken in via the inlet face and exhausted to the rear of the transmission terminal 10 via the exhaust face 1121. A right-side wall 1130 of the casing 1100 has a sound pickup hole 1131 formed thereon, and a built-in microphone 114, described later, is capable of picking up sound and noise.

An operation panel 1150 is formed toward the right-side wall 1130 of the casing 1100. The operation panel 1150 has a plurality of operation keys (108a to 108e) described later, a power switch 109 described later, and an alarm lamp 119 described later, which are formed thereon. In addition, the operation panel 1150 has a sound output face 1151 formed thereon, which is formed of a plurality of sound output holes for allowing output sound from a built-in speaker 115 described later to pass through. In addition, an accommodation portion 1160 serving as a recess for accommodating the arm 1200 and the camera housing 1300 is formed toward a left-side wall 1140 of the casing 1100. A plurality of connection ports (1132a to 1132c) for electrically connecting cables to an external device connection interface (I/F) 118 described later are provided on the right-side wall 1130 of the casing 1100. In contrast, a connection port for electrically connecting a cable 120c for a display 120 to the external device connection I/F 118 described later is provided on the left-side wall 1140 of the casing 1100.

The following description uses the term "operation key(s) 108" for indicating an arbitrary one or ones of the operation key (108a to 108e), and the term "connection port(s) 1132" for indicating an arbitrary one or ones of the connection ports (1132a to 1132c).

The arm 1200 is attached to the casing 1100 via a torque hinge 1210 and is configured to be rotatable in the vertical direction within the range of a tilt angle θ1 of 135 degrees with respect to the casing 1100. FIG. 4 indicates a state in which the tilt angle θ1 is 90 degrees.

The camera housing 1300 has a built-in camera 112 provided thereon, which will be described later, and the camera 112 can capture an image of a user, a document, a room, or the like. In addition, the camera housing 1300 has a torque hinge 1310 formed thereon. The camera housing 1300 is attached to the arm 1200 via the torque hinge 1310 and is configured to be rotatable in the vertical and horizontal directions within a range of a pan angle θ2 of ±180 degrees and a tilt angle θ3 of ±45 degrees with respect to the arm 1200, in which the state illustrated in FIG. 4 serves as 0 degrees.

Since the relay devices 30, the terminal management system 50, the counterpart registration system 80, the program providing system 90, and the maintenance system 100 each have the same appearance as that of a general server computer, descriptions of the appearances thereof are omitted.

Figure 5:
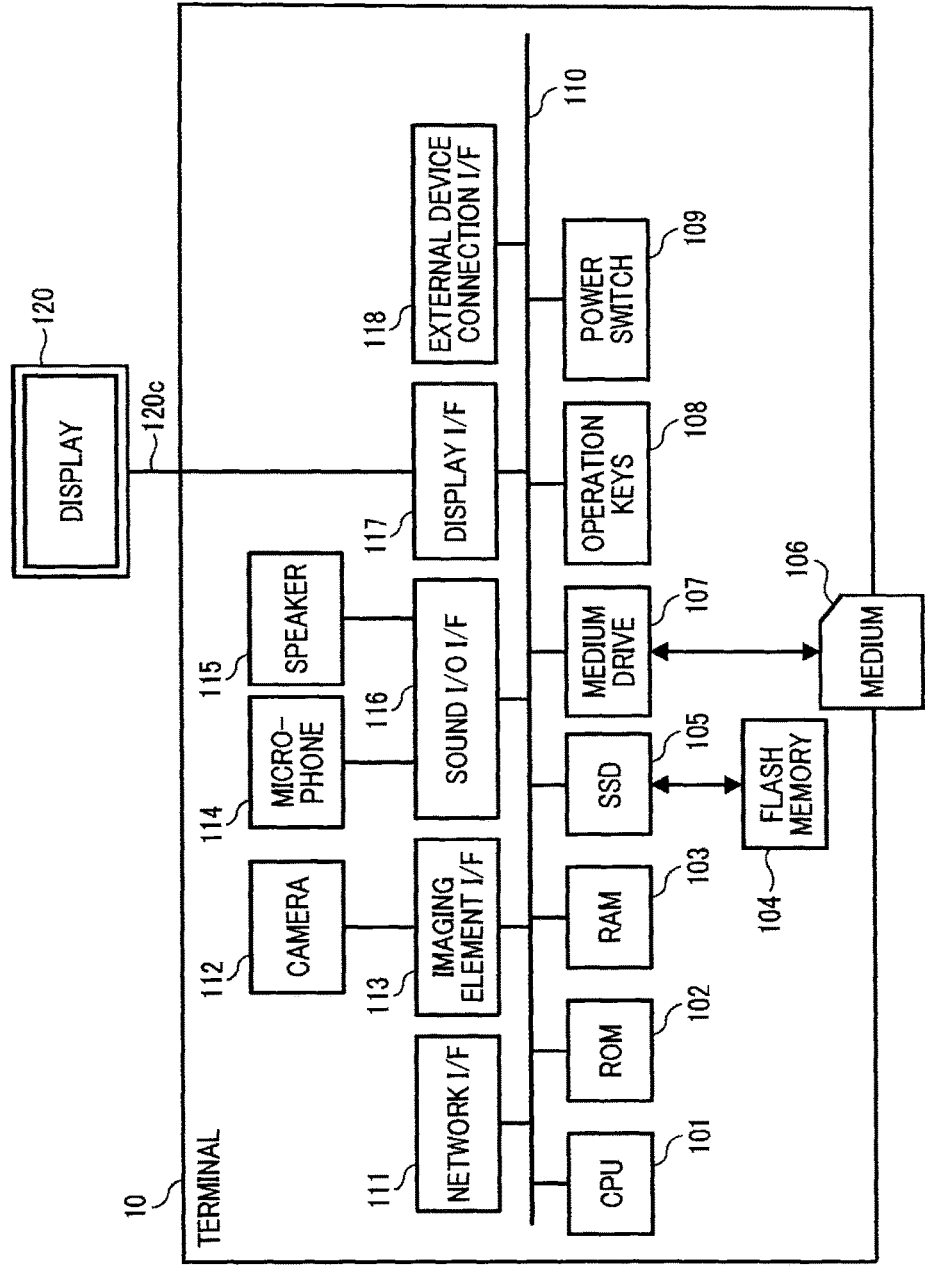
FIG. 5 is a hardware configuration diagram of the transmission terminal of the transmission system of FIG. 1.

FIG. 5 is a hardware configuration diagram of the transmission terminal of FIG. 4. As illustrated in FIG. 5, the transmission terminal 10 of the embodiment includes a central processing unit (CPU) 101 that controls the overall operation of the transmission terminal 10, a read-only memory (ROM) 102 that stores a program used for controlling the CPU 101, such as an initial program loader (IPL), a random-access memory (RAM) 103 used as a work area for the CPU 101, a flash memory 104 that stores various types of data, such as the transmission terminal program, image data, and sound data, a solid state drive (SSD) 105 that controls reading/writing of various types of data from/to the flash memory 104 under control of the CPU 101, a medium drive 107 that controls reading/writing (storage) of data from/to a carrier medium 106 such as a flash memory, the operation keys 108 operated in the case of, for example, selecting a counterpart terminal for the transmission terminal 10, the power switch 109 for turning on/off the power of the transmission terminal 10, and a network interface (I/F) 111 for transmitting data using the communication network 2.

In addition, the transmission terminal 10 includes the built-in camera 112, which captures an image of a subject and obtains image data under control of the CPU 101, an imaging element I/F 113 that controls driving of the camera 112, the built-in microphone 114, which receives a sound input, the built-in speaker 115, which outputs sound, a sound input/output I/F 116 that processes inputting/outputting of an audio signal between the microphone 114 and the speaker 115 under control of the CPU 101, a display I/F 117 that transmits image data to an external display 120 under control of the CPU 101, the external device connection I/F 118 connected to a connection port 1021g illustrated in FIG. 4 in order to connect various external devices, the alarm lamp 119, which indicates an abnormality of various functions of the transmission terminal 10, and a bus line 110 such as an address bus and a data bus for electrically connecting the above-described elements as illustrated in FIG. 8.

The display 120 is a display element formed of liquid crystal or organic electroluminescence (EL) that displays an image of a subject, an operation icon, or the like. In addition, the display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used.

The external device connection I/F 118 is capable of connecting an external device such as an external camera, an external microphone, or an external speaker by using a Universal Serial Bus (USB) cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

Note that the camera 112, the microphone 114, and the speaker 115 need not necessarily be included in the transmission terminal 10, and the transmission terminal 10 may be configured to be capable of connecting only an external camera, an external microphone, and an external speaker. In addition, the carrier medium 106 is configured to be removable from the transmission terminal 10. In addition, a non-volatile memory that reads or writes data under control of the CPU 101 is not limited to the flash memory 104, and an electrically erasable and programmable read-only memory (EEPROM) may be used instead.

Further, the transmission terminal program may be recorded in a file in an installable format or an executable format on a computer-readable carrier medium such as the recording medium 106 and circulated. In addition, the transmission terminal program may be stored on the ROM 102, instead of the flash memory 104.

Figure 6:
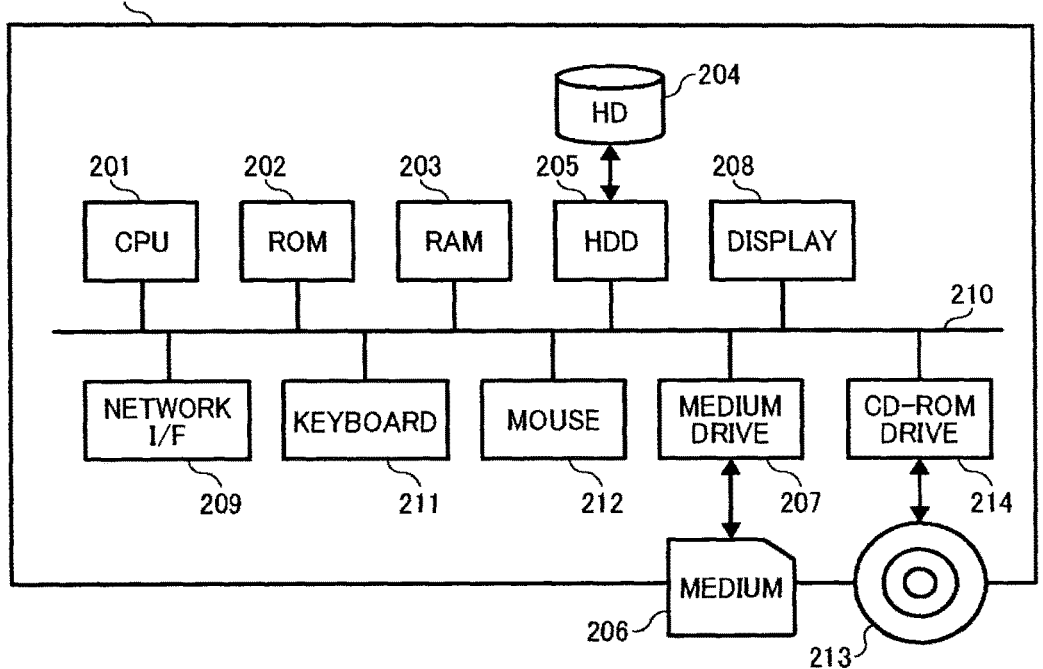
FIG. 6 is a hardware configuration diagram of a relay device, a terminal management system, a counterpart registration system, a program providing system, and a maintenance system of the transmission system of FIG. 1.

FIG. 6 is a hardware configuration diagram of the relay devices, the terminal management system, the counterpart registration system, the program providing system, and the maintenance system. The terminal management system 50 includes a CPU 201 that controls the overall operation of the terminal management system 50, a ROM 202 that stores a program used for controlling the CPU 201, such as an IPL, a RAM 203 used as a work area for the CPU 201, an HD 204 that stores various types of data, such as the terminal management program, a hard disk drive (HDD) 205 that controls reading/writing of various types of data from/to the HD 204 under control of the CPU 201, a medium drive 207 that controls reading/writing (storage) of data from/to a recording medium 206 such as a flash memory, a display 208 that displays various types of information such as a cursor, a menu, a window, characters, or an image, a network I/F 209 for transmitting data using the communication network 2, a keyboard 211 including a plurality of keys for entering characters, numerals, and various instructions, a mouse 212 that selects and executes various instructions, selects a processing target, and moves the cursor, a compact disc read-only memory (CD-ROM) drive 214 that controls reading/writing of various types of data from/to a CD-ROM 213 serving as an example of a removable recording medium, and a bus line 210 such as an address bus and a data bus for electrically connecting the above-described elements.

Note that the terminal management program may be recorded in a file in an installable format or an executable format on a computer-readable recording medium such as the recording medium 206 or the CD-ROM 213 and distributed. In addition, the terminal management program may be stored on the ROM 202, instead of the HD 204.

In addition, since the relay devices 30 have a hardware configuration that is the same as or similar to that of the above-described terminal management system 50, a description thereof is omitted. Note that the HD 204 stores a relay device program for controlling the relay devices 30. Also in this case, the relay device program may be recorded in a file in an installable format or an executable format on a computer-readable recording medium such as the recording medium 206 or the CD-ROM 213 and distributed. In addition, the relay device program may be stored on the ROM 202, instead of the HD 204.

Further, since the counterpart registration system 80 has a hardware configuration that is the same as or similar to that of the above-described terminal management system 50, a description thereof is omitted. Note that the HD 204 stores a counterpart registration program for controlling the counterpart registration system 80. Also in this case, the counterpart registration program may be recorded in a file in an installable format or an executable format on a computer-readable recording medium such as the recording medium 206 or the CD-ROM 213 and distributed. In addition, the counterpart registration program may be stored on the ROM 202, instead of the HD 204.

In addition, since the program providing system 90 and the maintenance system 100 each have a hardware configuration that is the same as or similar to that of the above-described terminal management system 50, descriptions thereof are omitted. Note that the HD 204 stores a program providing program for controlling the program providing system 90. Also in this case, the program providing program may be recorded in a file in an installable format or an executable format on a computer-readable recording medium such as the recording medium 206 or the CD-ROM 213 and distributed. In addition, the program providing program may be stored on the ROM 202, instead of the HD 204. In addition, the same applies to the maintenance system 100 and a maintenance program.

Note that each of the above-described programs may be recorded on a computer-readable recording medium such as a compact disc recordable (CD-R), a digital versatile disk (DVD), or a Blu-ray disk, which serve as other examples of the above-described removable recording medium, and may be provided.

<Functional Configuration>

Figure 7:
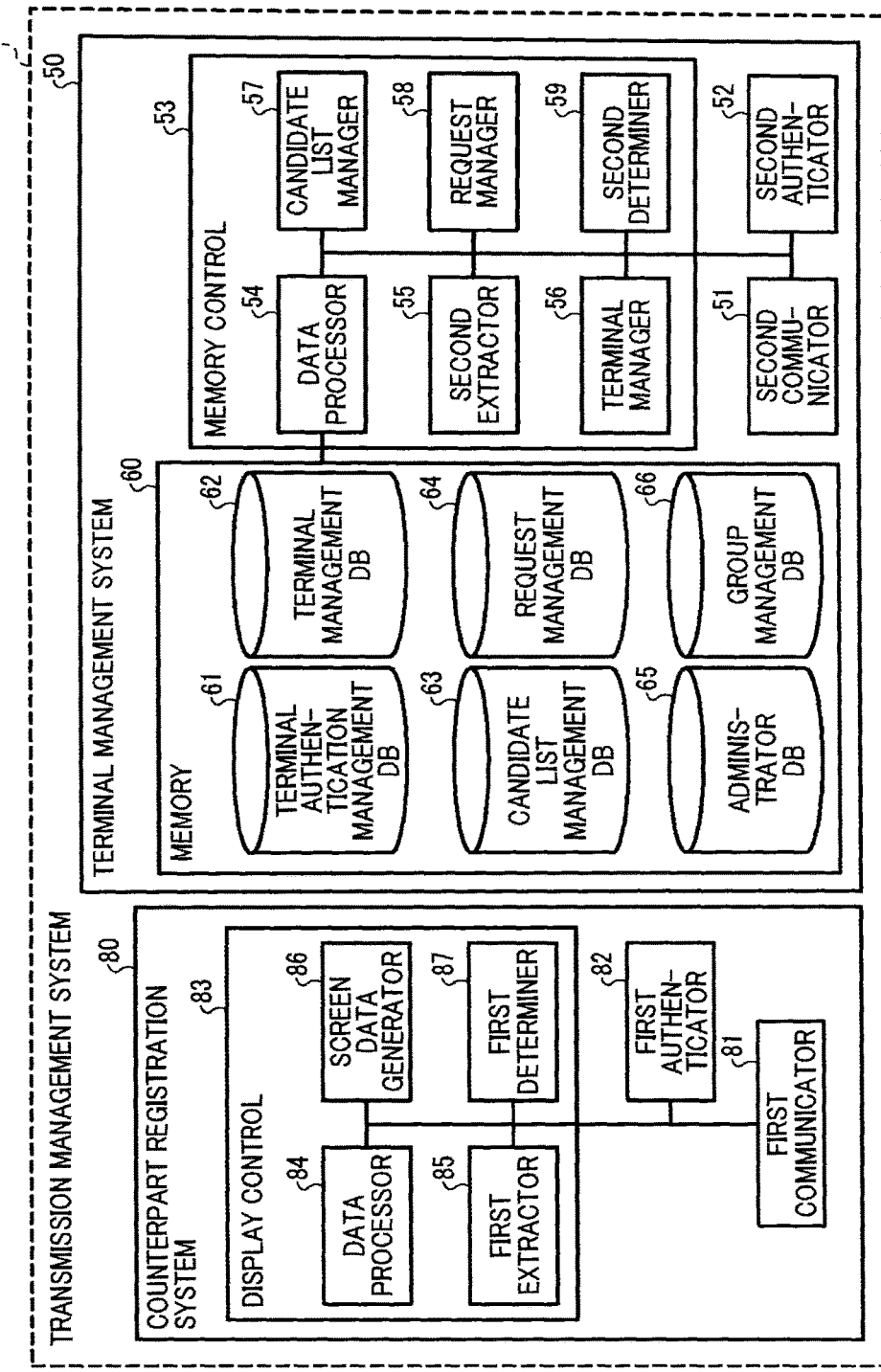
FIG. 7 is a functional block diagram of the terminal management system and the counterpart registration system included in the transmission management system of FIG. 1.

Hereinafter, referring to FIGS. 7 to 13, the functional configuration of the terminal management system 50 and the counterpart registration system 80 in particular will be described. Note that FIG. 7 is a functional block diagram of the terminal management system and the counterpart registration system included in the transmission management system.

(Functional Configuration of Terminal Management System)

First, the terminal management system 50 will be described. With the hardware configuration illustrated in FIG. 6 that operates in cooperation with the terminal management program, the terminal management system 50 includes a second communicator 51, a second authenticator 52, a memory control 53, and a memory 60. The memory control 53 includes a data processor 54, a second extractor 55, a terminal manager 56, a candidate list manager 57, a request manager 58, and a second determiner 59. The memory 60 includes a terminal authentication management DB 61, a terminal management DB 62, a candidate list management DB 63, a request management DB 64, an administrator DB 65, and a group management DB 66.

FIG. 8 is a conceptual diagram of the terminal authentication management DB 61. The terminal authentication management DB 61 manages items of information indicating a terminal ID and a password as items of association information that are associated with each other. The terminal ID is one example of identification information for identifying a transmission terminal 10. The terminal ID (an example of terminal identification information) may be identification information stored in advance in the transmission terminal 10, or may be identification information input by the user of the transmission terminal 10 to the transmission terminal 10. The password is a password for the transmission terminal 10 used to log in to the transmission management system 40 with the terminal ID. Note that records in the terminal authentication management DB 61 may have columns (fields) other than those described above.

FIG. 9 is a conceptual diagram of the terminal management DB 62. The terminal management DB 62 manages items of information indicating a terminal ID, name, operation state, date/time received, and the IP address of a terminal as items of association information that are associated with one another. Among these items of information, the terminal ID is one example of identification information for identifying a transmission terminal 10. The name is the name of the transmission terminal 10. Note that the name may be the name of the user of the transmission terminal 10, the name of a department to which the user belongs, or the like. The operation state is the most recent operation state of the transmission terminal 10 that can be obtained. The date/time received is the date and time at which a login request from the transmission terminal 10 to the transmission management system 40 has been received. The IP address is the IP address of the transmission terminal 10. Note that records in the terminal management DB 62 may have columns other than those described above.

FIG. 10 is a conceptual diagram of the candidate list management DB 63. The candidate list management DB 63 manages the terminal ID of a starting terminal and the terminal ID of a candidate counterpart terminal that may be a counterpart terminal as items of association information that are associated with each other. Note that records in the candidate list management DB 63 may have columns other than those described above.

FIG. 11 is a conceptual diagram of the request management DB 64. The request management DB manages, as items of association information associated with each other, the terminal ID of a request sender terminal on a request sender side that has given a candidate counterpart terminal registration request or the group ID of a group similarly on a request sender side, and the terminal ID of a request destination terminal requested to be registered on a request destination side or the group ID of a group similarly requested to be registered on a request destination side. Note that a group ID is an example of group identification information. In this example, the group is a group of transmission terminals 10 managed by an administrator. Although the name of the term is different from "group", "team" or "organization" is also treated as the "group" as long as it refers to a set of transmission terminals 10. Note that records in the request management DB 64 may have columns other than those described above.

FIG. 12 is a conceptual diagram of the administrator DB 65. The administrator DB 65 manages an administrator ID, a password, and a group ID as items of association information that are associated with one another. Among these items of information, the administrator ID is one example of identification information for identifying the administrator of a transmission terminal 10. The administrator ID may be the name of the administrator. The password is a password for logging in to the transmission management system 40 with the administrator ID. The group ID is identification information for identifying a group under management of the administrator. Referring to FIG. 12, it is indicated that an administrator A with the administrator ID "02A" manages a group G1 with the group ID "G001" and a group G2 with the group ID "G002". In addition, it is also indicated that an administrator B with the administrator ID "02B" manages a group G3 with the group ID "G003". Further, it is also indicated that an administrator D with the administrator ID "02D" manages a group G4 with the group ID "G004". Note that records in the administrator DB 65 may have columns other than those described above.

FIG. 13 is a conceptual diagram of the group management DB 66. The group management DB 66 manages a group ID, a group name, and a terminal ID for identifying a transmission terminal 10 (management terminal) belonging to each group as items of association information that are associated with one another. The group ID is identical to the group ID illustrated in FIG. 12. Note that records in the group management DB 66 may have columns other than those described above.

Referring back to FIG. 7, the second communicator 51 communicates with a transmission terminal 10 and other systems via the communication network 2.

The second authenticator 52 authenticates a transmission terminal 10 when the transmission terminal 10 tries to log in to the terminal management system 50 (transmission management system 40) in order to start communication with another transmission terminal 10. Specifically, the second authenticator 52 searches the terminal authentication management DB 61 of the memory 60 by using a terminal ID and a password included in login information received by the second communicator 51 as search keys. The second authenticator 52 determines whether the search keys match information in the terminal authentication management DB 61, thereby authenticating whether to permit login to the terminal management system 50.

The terminal manager 56 manages the operation state of a transmission terminal 10, such as the terminal 10 that has given a login request to the transmission management system 40. The terminal manager 56 updates a record in the terminal management DB 62 that corresponds to the terminal ID of the transmission terminal 10, which has given the login request to the transmission management system 40. Specifically, in the case of successful login, the "operation state" is changed from offline to online (communication OK), and the "date/time received" and the "IP address" are updated.

The second extractor 55 searches the candidate list management DB 63 by using, for example, the terminal ID of the transmission terminal 10, which has given the login request to the transmission management system 40, as a search key, and reads a terminal ID registered as a candidate counterpart terminal for the transmission terminal 10 that has given the login request. In addition, the second extractor 55 searches the terminal management DB 62 by using the extracted terminal ID as a search key, and reads the operation state of a transmission terminal 10 for every extracted terminal ID. The read terminal ID and the operation state are transmitted to the transmission terminal 10, which has given the login request to the transmission management system 40, via the second communicator 51. With this process, a candidate list including a candidate counterpart terminal(s) is displayed on the display 120 of the transmission terminal 10, which has given the request. The user of the transmission terminal 10 selects a desired counterpart terminal from the candidate list, thereby establishing a session sed between the transmission terminals 10 and realizing communication between the transmission terminals 10.

Note that the session sed between the transmission terminals 10 may be established via the transmission management system 40 or may directly be established. In addition, the transmission terminals 10 can exchange content data through the session sed.

In addition, the second extractor 55 can also search the candidate list management DB 63 by using the terminal ID of the transmission terminal 10, which has given the login request to the transmission management system 40, as a search key, and extract the terminal ID of a starting terminal from a record in which the terminal ID of the transmission terminal 10, which has given the login request, is registered as the terminal ID of a candidate counterpart terminal. Accordingly, the second extractor 55 searches the terminal management DB 62 by using, as a search key, the terminal ID of a starting terminal that registers the transmission terminal 10, which has given the login request, as a candidate counterpart terminal, thereby extracting a corresponding operation state.

The request manager 58 adds, changes, and deletes a record to/in/from the request management DB 64.

The candidate list manager 57 adds, changes, and deletes a record to/in/from the candidate list management DB 63. For example, the candidate list manager 57 extracts a record in the candidate list management DB 63 in which the terminal ID of a request sender terminal managed in the request management DB 64 matches the terminal ID of a starting terminal in the candidate list management DB 63. The candidate list manager 57 adds the ID of a request destination terminal to the column of the terminal ID of a candidate counterpart terminal in the extracted record.

The data processor 54 performs processing to store data in the memory 60. In addition, the data processor 54 performs processing to read data stored in the memory 60.

The second determiner 59 determines whether a terminal ID and an administrator ID (first administrator ID) received by the second communicator 51 are associated with each other in the above-described association information (first determination). In addition, in the case where it has been determined by the first determination that there is no association, the second determiner 59 determines whether there is another administrator ID (second administrator ID) associated with this terminal ID in the association information (second determination). Further, in the case where it has been determined by the second determination that there is a second administrator ID, the second determiner 59 determines whether attribute information associated with the first administrator ID in the association information (first attribute information) is identical to attribute information associated with the second administrator ID in the association information (second attribute information) (third determination).

(Functional Configuration of Counterpart Registration System)

Next, the counterpart registration system 80 will be described. With the hardware configuration illustrated in FIG. 6 that operates in cooperation with the counterpart registration program, the counterpart registration system 80 includes a first communicator 81, a first authenticator 82, and a display control 83. Further, the display control 83 includes a data processor 84, a first extractor 85, a screen data generator 86, and a first determiner 87.

Among these elements, the first communicator 81, the data processor 84, and the first extractor 85 have functions that are the same as or similar to those of the second communicator 51, the data processor 54, and the second extractor 55, respectively, and hence descriptions thereof are omitted. Although the counterpart registration system 80 has no memory, the data processor 84 and the first extractor 85 can realize the same functions as those of the data processor 54 and the second extractor 55 by accessing the memory 60 of the terminal management system 50 via the communication network 2.

The first authenticator 82 authenticates a transmission terminal 10 or an administrator terminal 20 when the transmission terminal 10 or the administrator terminal 20 tries to log in to the counterpart registration system 80 (transmission management system 40) in order to add or delete a candidate counterpart terminal. Specifically, a request to add or delete a candidate counterpart terminal can be given not only from the transmission terminal 10, but also from the administrator terminal 20.

In addition, the first authenticator 82 searches the terminal authentication management DB 61 (or the administrator DB 65) of the memory 60 by using a terminal ID (or an administrator ID) and a password included in login information received by the first communicator 81 as search keys. The first authenticator 82 determines whether the search keys match information in the terminal authentication management DB 61 (or the administrator DB 65), thereby authenticating whether to permit login to the counterpart registration system 80 (transmission management system 40).

The screen data generator 86 generates an authentication screen (see FIG. 18), an administrator registration screen (see FIG. 19), a management terminal list screen (see FIG. 20), a management terminal registration screen (see FIG. 22), a candidate counterpart terminal registration screen (see FIG. 26), and the like. The screen data generator 86 generates a screen in, for example, HyperText Markup Language (HTML).

Next, using FIGS. 14 to 16, a plurality of patterns of a process of registering a candidate counterpart terminal managed in a candidate list will be described. Note that, here, the administrator A manages the group G1 (the first sales division) and the group G2 (the second sales division), and the administrator D manages the group G4 (second development division). The group G1 includes transmission terminals (10aa and 10ab), and the group G2 includes transmission terminals (10ba, 10bb, and 10bc). The group G4 includes transmission terminals (10da, 10db, and 10dc).

(First Pattern)

Figure 14:
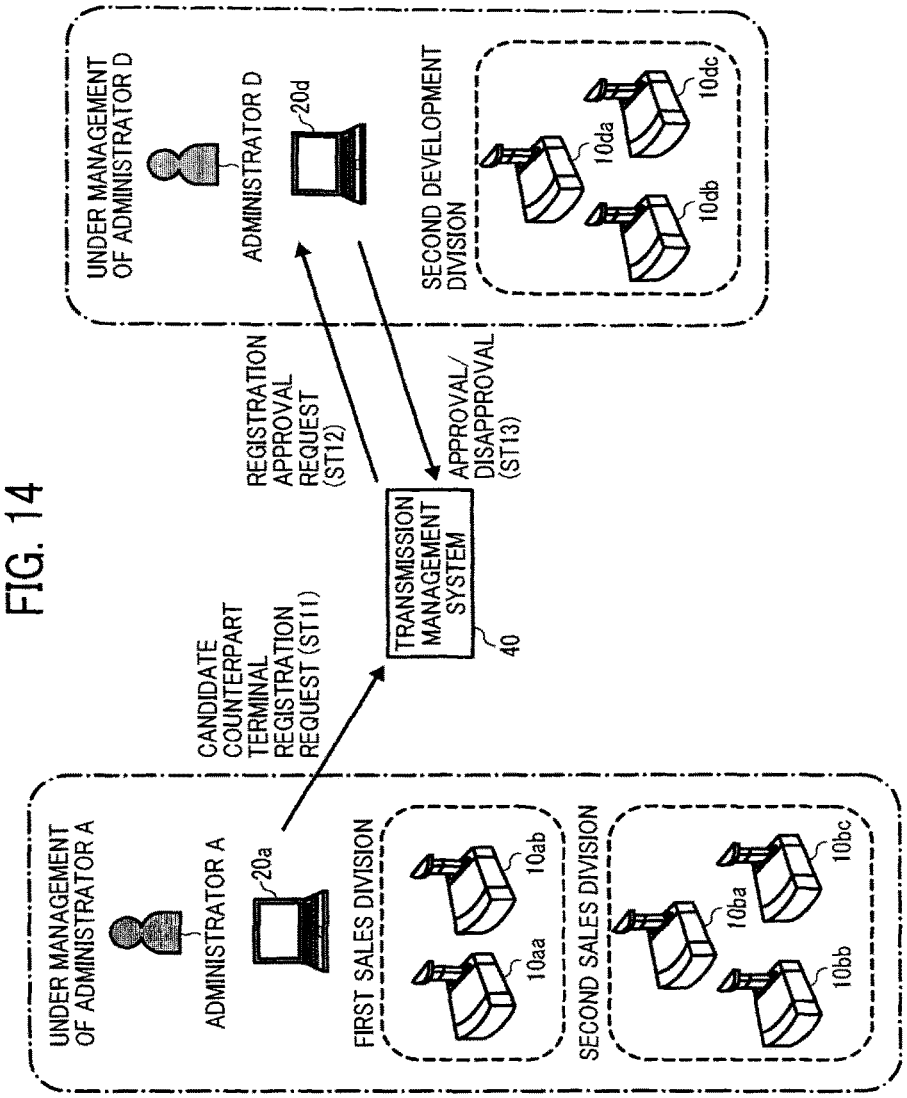
FIG. 14 is a conceptual diagram illustrating an example of a candidate counterpart terminal registration process.

A first pattern is illustrated in FIG. 14, which illustrates a registration process in the case where, in place of the user of the transmission terminal 10aa in the group G1, the administrator A of the group G1 (first sales division) and the group G2 (second sales division) gives a request for registering all the transmission terminals (10da, 10db, and 10dc) in the group G4 under management of the administrator D as candidate counterpart terminals in a candidate list of the transmission terminal 10aa, to the transmission management system 40 from the administrator terminal 20a. Note that FIG. 14 is a conceptual diagram illustrating an example of a candidate counterpart terminal registration process. First, the administrator terminal 20a transmits, to the transmission management system 40, a candidate counterpart terminal registration request indicating a request for registering all the transmission terminals (10da, 10db, and 10dc) in the group G4 as candidate counterpart terminals in a candidate list of the transmission terminal 10aa, on the basis of an operation performed by the administrator A (ST11). Next, the transmission management system 40 transmits, to the administrator terminal 20d of the administrator D of the group G4, an approval request indicating a request for approval in order to register the transmission terminals (10da, 10db, and 10dc) as candidate counterpart terminals of the transmission terminal 10aa (ST12). In response to this, the administrator terminal 20d transmits a response indicating approval or disapproval to the transmission management system 40 (ST13). Accordingly, in the case of reception of a response indicating approval, the transmission management system 40 registers all the transmission terminals (10da, 10db, and 10dc) in the group G4 as candidate counterpart terminals in a candidate list of the transmission terminal 10aa. Further, the transmission management system 40 registers the candidate counterpart terminal 10aa as a candidate counterpart terminal in each of candidate lists of all the transmission terminals (10da, 10db, and 10dc) in the group G4. Note that, although the administrator A gives a candidate counterpart terminal registration request from the administrator terminal 20a, in place of the user of the transmission terminal 10, the users of the transmission terminals (10aa and 10ab) may give a candidate counterpart terminal registration request using the transmission terminals (10aa and 10ab), respectively.

(Second Pattern)

Figure 15:
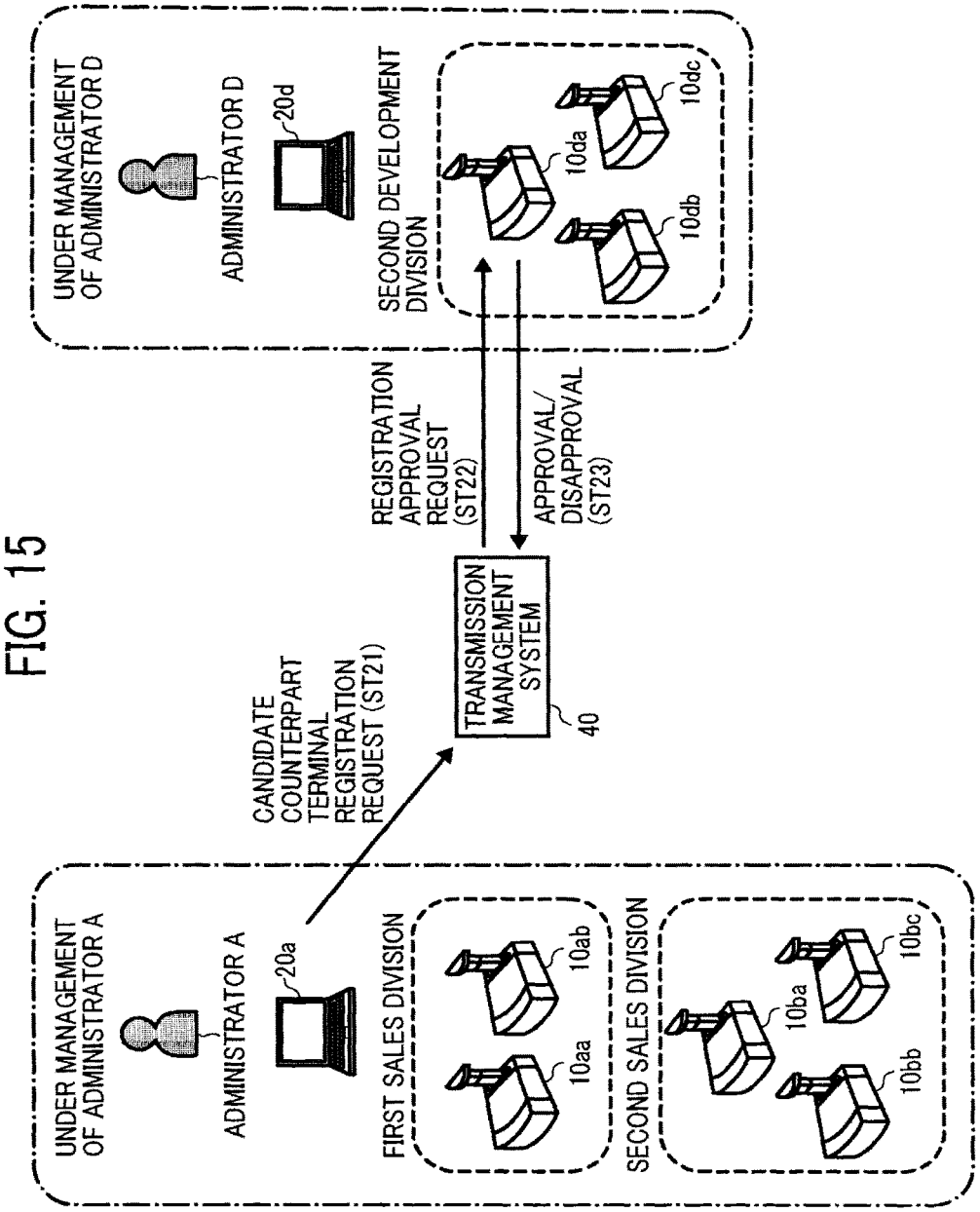
FIG. 15 is a conceptual diagram illustrating an example of a candidate counterpart terminal registration process.

A second pattern is illustrated in FIG. 15, which illustrates a registration process in the case where, in place of the users of all the transmission terminal (10aa and 10ab) in the group G1, the administrator A of the group G1 (first sales division) and the group G2 (second sales division) gives a request for registering the transmission terminal 10da in the group G4 under management of the administrator D as a candidate counterpart terminal in each of candidate lists of the transmission terminals (10aa and 10ab), to the transmission management system 40 from the administrator terminal 20a. Note that FIG. 15 is a conceptual diagram illustrating an example of a candidate counterpart terminal registration process.

First, the administrator terminal 20a transmits, to the transmission management system 40, a candidate counterpart terminal registration request indicating a request for registering the transmission terminal 10da in the group G4 as a candidate counterpart terminal in each of candidate lists of all the transmission terminals (10aa and 10ab) in the group G1, on the basis of an operation performed by the administrator A (ST21). Next, the transmission management system 40 transmits to the transmission terminal 10da an approval request indicating a request for approval in order to register the transmission terminal 10da as a candidate counterpart terminal of each of all the transmission terminals (10aa and 10ab) in the group G1 (ST22). In response to this, the transmission terminal 10da transmits a response indicating approval or disapproval to the transmission management system 40 (ST23). Accordingly, in the case of reception of a response indicating approval, the transmission management system 40 registers the transmission terminal 10da as a candidate counterpart terminal in each of candidate lists of all the transmission terminals (10aa and 10ab) in the group G1. Further, the transmission management system 40 registers all the transmission terminals (10aa and 10ab) in the group G1 as candidate counterpart terminals in a candidate list of the transmission terminal 10da.

(Third Pattern)

Figure 16:
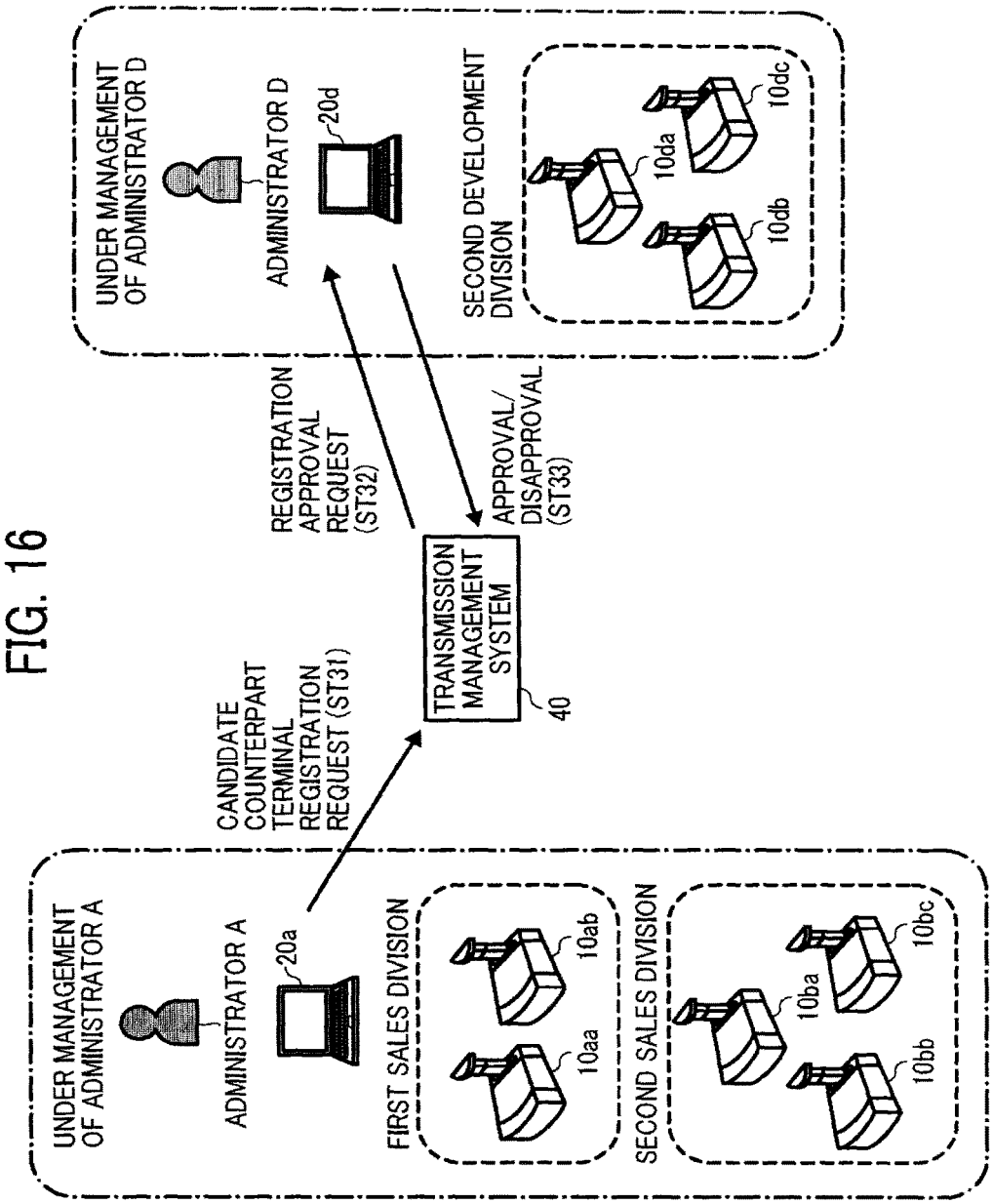
FIG. 16 is a conceptual diagram illustrating an example of a candidate counterpart terminal registration process.

A third pattern is illustrated in FIG. 16, which illustrates a registration process in the case where, in place of the users of all the transmission terminal (10aa and 10ab) in the group G1, the administrator A of the group G1 (first sales division) and the group G2 (second sales division) gives a request for registering all the transmission terminals (10da, 10db, and 10dc) in the group G4 under management of the administrator D as candidate counterpart terminals in each of candidate lists of the transmission terminals (10aa and 10ab), to the transmission management system 40 from the administrator terminal 20a. Note that FIG. 16 is a conceptual diagram illustrating an example of a candidate counterpart terminal registration process.

First, the administrator terminal 20a transmits, to the transmission management system 40, a candidate counterpart terminal registration request indicating a request for registering all the transmission terminals (10da, 10db, and 10dc) in the group G4 as candidate counterpart terminals in each of candidate lists of all the transmission terminals (10aa and 10ab) in the group G1, on the basis of an operation performed by the administrator A (ST31). Next, the transmission management system 40 transmits, to the administrator terminal 20d of the administrator D of the group G4, an approval request indicating a request for approval in order to register all the transmission terminals (10da, 10db, and 10dc) as candidate counterpart terminals of each of all the transmission terminals (10aa and 10ab) in the group G1 (ST32). In response to this, the administrator terminal 20d transmits a response indicating approval or disapproval to the transmission management system 40 (ST33). Accordingly, in the case of reception of a response indicating approval, the transmission management system 40 registers all the transmission terminals (10da, 10db, and 10dc) in the group G4 as candidate counterpart terminals in each of candidate lists of all the transmission terminal (10aa and 10ab) in the group G1. Further, the transmission management system 40 registers all the transmission terminals (10aa and 10ab) in the group G1 as candidate counterpart terminals in each of candidate lists of all the transmission terminal (10da, 10db, and 10dc) in the group G4.

<Operation or Process>

Figure 17:
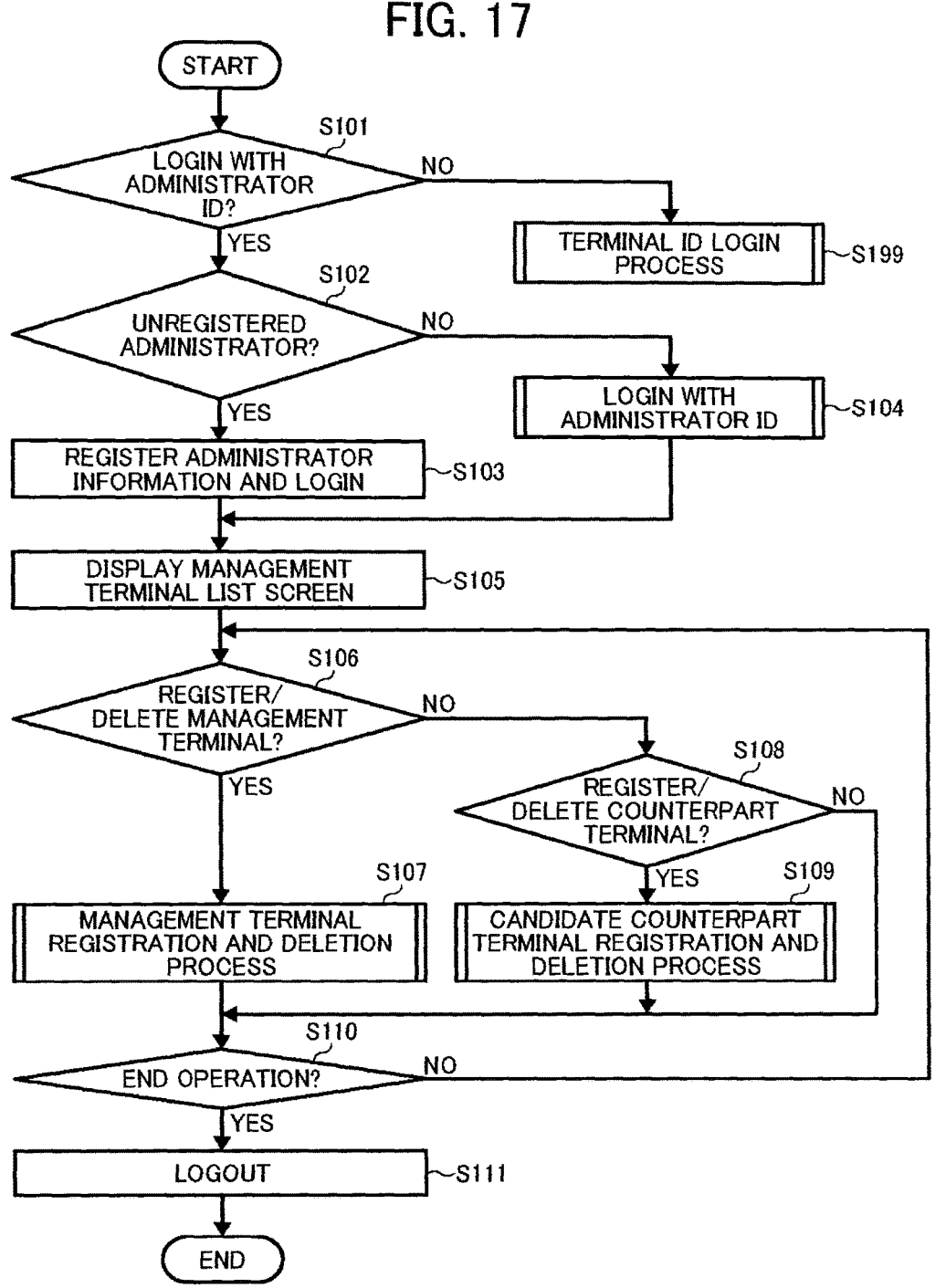
FIG. 17 is a flowchart illustrating operation of managing information regarding management terminals or candidate counterpart terminals, performed by the transmission management system of FIG. 1.

Next, referring to FIGS. 17 to 28, an operation or a process of the embodiment will be described. FIG. 17 is a flowchart illustrating example operation of managing candidate counterpart terminal information performed by the transmission management system 40.

First, the first authenticator 82 of the counterpart registration system 80 determines whether a login request given with an administrator ID from an administrator terminal 20 operated by an administrator has been accepted via the communication network2 (step S101). In the case where a login request given with an administrator ID has been accepted (Yes in step S101), the process proceeds to step S102. In the case where login request given with an administrator ID is not accepted (a login request given from a user using a terminal ID has been accepted) (No in step S101), a login process using the ID of the user is performed (step S199). In this example, while a transmission terminal 10 operated by the user can only perform a process of registering a candidate counterpart terminal in a candidate list of the transmission terminal 10, the administrator terminal operated by the administrator can perform a process of registering a candidate counterpart terminal in all the candidate lists of management terminals (transmission terminals 10 under management of the administrator).

FIG. 18 is a conceptual diagram of an authentication screen of the transmission management system 40. Prior to a login request in step S101, the screen data generator 86 displays, via the first communicator 81, an authentication screen illustrated by way of example in FIG. 18 on the administrator terminal 20 operated by the administrator.

Items of screen data illustrated in FIGS. 18 to 21 are held by the screen data generator 86 itself. Alternatively, these items of screen data illustrated in FIGS. 18 to 21 may be stored in the memory 60, and the data processor 84 may read these items of screen data from the memory 60 in response to a command from the screen data generator 86.

Referring back to FIG. 17, in the case where it has been determined in step S101 described above that a login request has been given with an administrator ID (Yes in step S101), the first authenticator 82 determines whether administrator information, such as the administrator ID or password, is unregistered in the administrator DB 65 (step S102). In the case where administrator information is registered in the administrator DB 65 (No in step S102), the first authenticator 82 permits login (step S104). In contrast, in the case where administrator information is unregistered in the administrator DB 65 (Yes in step S102), the screen data generator 86 displays, via the first communicator 81, a registration screen on the administrator terminal 20 operated by the administrator, and, after administrator information input to the registration screen is registered in the administrator DB 65, the administrator logs in to the counterpart registration system 80 (step S103). An example of the case in which administrator information is unregistered in the administrator DB 65 is, for example, the case in which the administrator is registered for the first time using an initial setting password.

FIG. 19 is a conceptual diagram of an administrator registration screen. In step S103, for example, the administrator registration screen illustrated in FIG. 19 is displayed on the administrator terminal 20.

Figure 20:
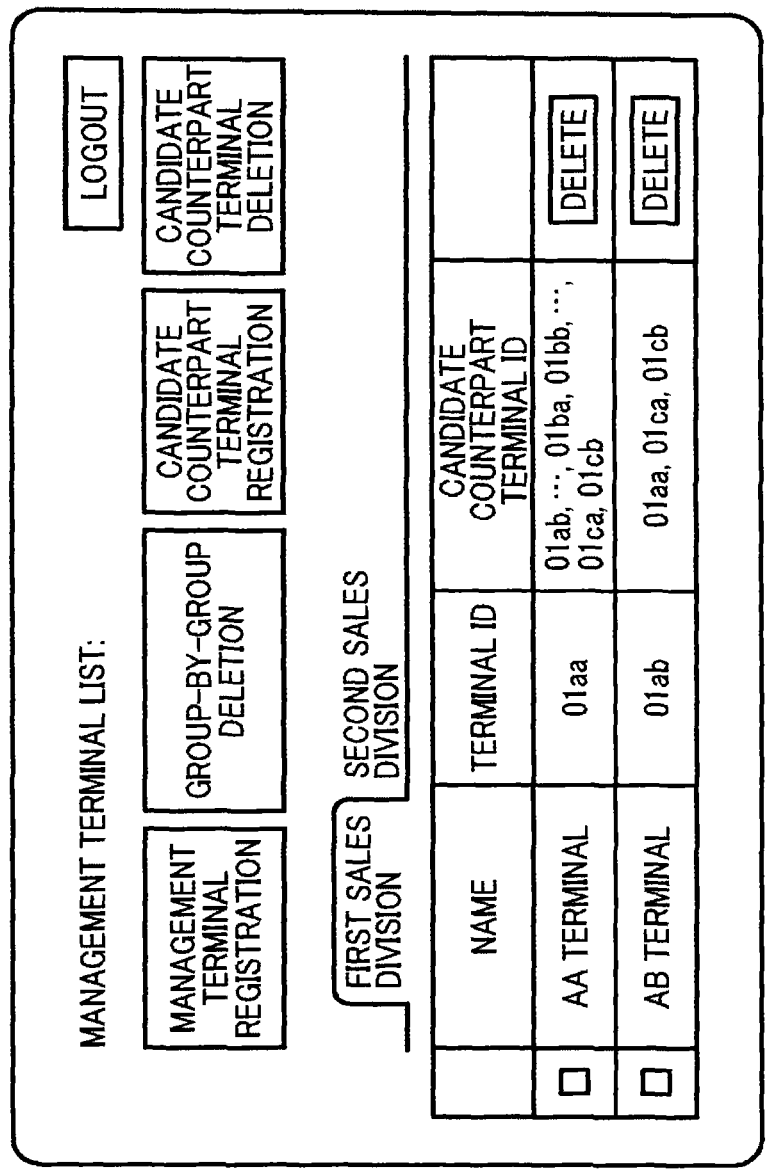
FIG. 20 is a conceptual diagram of a management terminal list screen.

Referring back to FIG. 17, the screen data generator 86 generates a management terminal list screen illustrated in FIG. 20, and the first communicator 81 transmits data of the management terminal list screen to the administrator terminal 20, thereby displaying the screen (step S105). FIG. 20 is a conceptual diagram of the management terminal list screen. The management terminal list screen indicates a list of transmission terminals 10 managed by the administrator.

Specifically, the first extractor 85 searches the administrator DB 65 by using the administrator ID accepted by the counterpart registration system 80 as a search key, and obtains a group ID associated with the administrator ID. The first extractor 85 searches the group management DB 66 by using the group ID as a search key, and obtains a group name and the terminal ID of a management terminal associated with the group ID. Further, the first extractor 85 searches the candidate list management DB 63 for the terminal ID of a starting terminal by using the obtained terminal ID of a management terminal as a search key, and obtains the terminal ID of a candidate counterpart terminal associated with the terminal ID of the starting terminal. In this manner, the screen data generator 86 can generate a management terminal list screen on the basis of the information obtained by the first extractor 85.

On the management terminal list screen generated as above, names and terminal IDs of management terminals in the terminal management DB 62, and the terminal ID of one or more candidate counterpart terminals registered for the management terminal (starting terminal) in the candidate list management DB 63 are displayed in association with one another. In addition, for each management terminal 10 having the terminal ID, a check box that may be selected to specify the terminal 10 with the terminal ID, and a "delete" key that is pressed when deleting the terminal 10 from management terminals or deleting the candidate counterpart terminal for the terminal 10 are also displayed. In addition, an index indicating a group name is displayed, for example, in the form of tab. FIG. 20 indicates that the administrator A manages, as a plurality of groups, the group G1 (the first sales division) and the group G2 (the second sales division).

Further, it is displayed that, the transmission terminal 10aa with the name "AA terminal" and the transmission terminal 10ab with the name "AB terminal" are managed as management terminals in the group G1 (the first sales division).

In addition, on the management terminal list screen, a "management terminal registration" key for newly registering a transmission terminal 10 as a management terminal, and a "group-by-group deletion" key for deleting transmission terminals 10 that are already registered as management terminals, in units of groups are displayed. That is, the "delete" key displayed in association with each terminal name is pressed in the case of deleting a transmission terminal 10 indicated by this name from a group. In contrast, the "group-by-group deletion" key is pressed in the case of deleting all transmission terminals 10 in a group indicated in a selected index.

Further, on the management terminal list screen, a "candidate counterpart terminal registration" key for newly registering a transmission terminal 10 as a candidate counterpart terminal, and a "candidate counterpart terminal deletion" key for deleting a transmission terminal 10 already registered as a candidate counterpart terminal from candidate counterpart terminals are displayed. Note that a "logout" key for logging out is also displayed. Each key is selected by pressing that key by the administrator.

Next, referring back to FIG. 17, the screen data generator 86 determines whether the "management terminal registration" key or the "management terminal deletion" key has been selected on the administrator terminal 20 side (step S106). In the case where the "management terminal registration" key or the "management terminal deletion" key has been selected (Yes in step S106), a later-described (Management Terminal Registration and Deletion Process) is performed (step S107). In contrast, in the case where neither the "management terminal registration" key nor the "management terminal deletion" key has been selected (No in step S106), the process proceeds to step S108.

Next, the screen data generator 86 determines whether the "candidate counterpart terminal registration" key or the "candidate counterpart terminal deletion" key has been selected at the administrator terminal 20 side (step S108). In the case where the "candidate counterpart terminal registration" key or the "candidate counterpart terminal deletion" key has been selected (Yes in step S108), a later-described (Candidate Counterpart Terminal Registration and Deletion Process) is performed (step S109). In contrast, in the case where neither the "candidate counterpart terminal registration" key nor the "candidate counterpart terminal deletion" key has been selected (No in step S108), the process proceeds to step S110.

Next, the screen data generator 86 determines whether the operation by the administrator ends by determining whether the "logout" key has been selected at the administrator terminal 20 (step S110). In the case where the "logout" key has been selected (Yes in step S110), the counterpart registration system 80 permits the administrator terminal 20 to log out (step S111). In the case where the "logout" key has not been selected (No in step S110), the process returns to step S106.

(Management Terminal Registration and Deletion Process)

Figure 21:
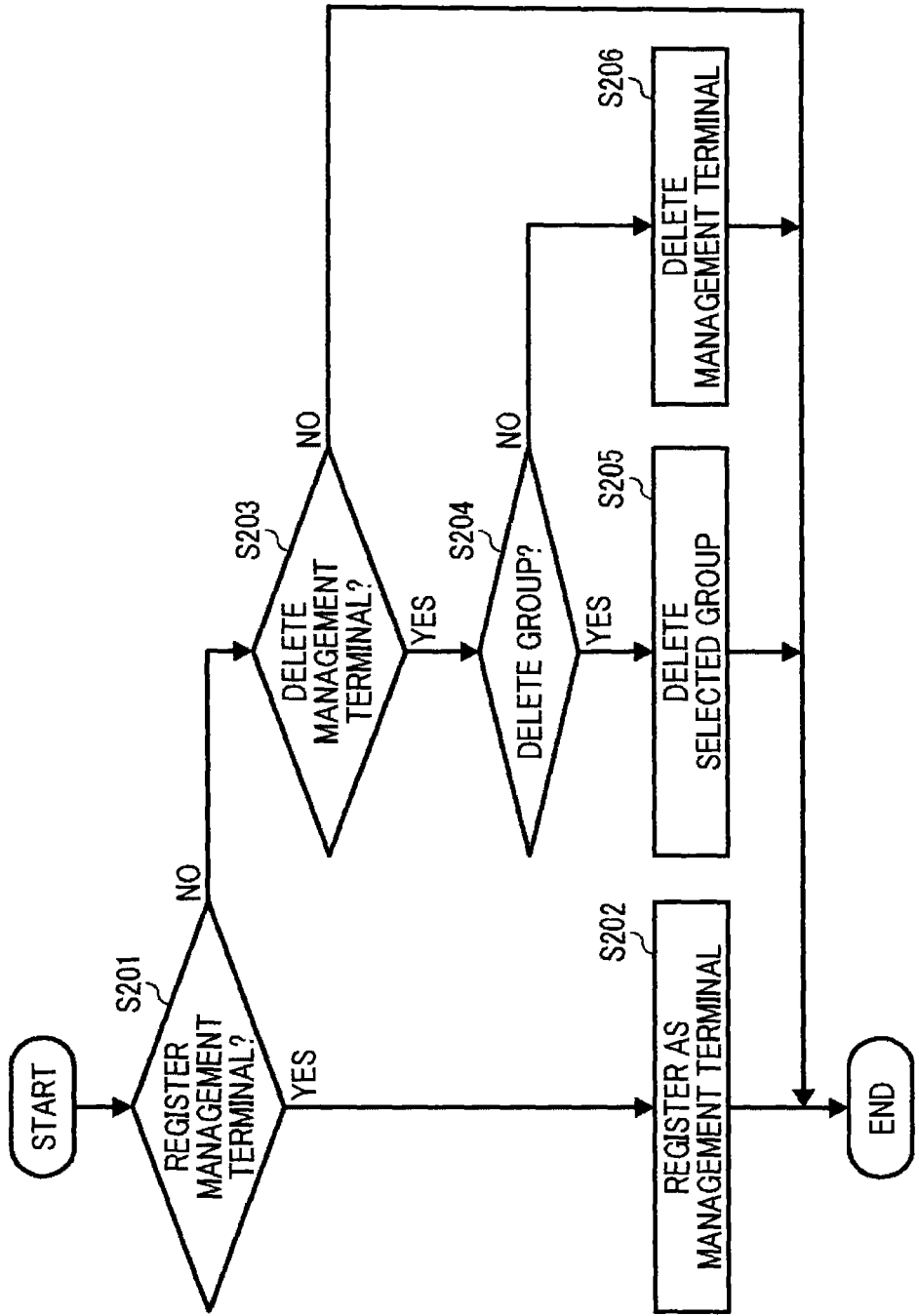
FIG. 21 is a flowchart illustrating a management terminal registration and deletion process.
Figure 24:
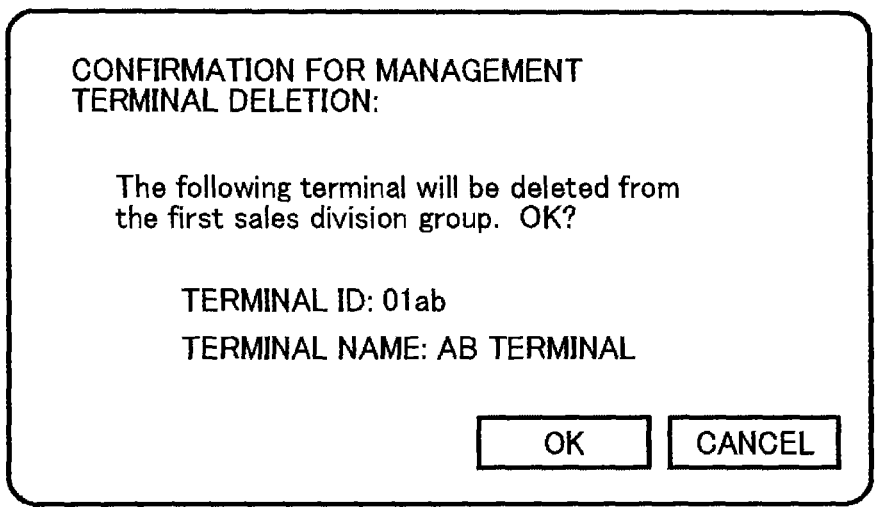
FIG. 24 is a conceptual diagram of a confirmation screen for management terminal deletion.

Next, using FIGS. 20 to 24, the management terminal registration and deletion process in step S106 will be described. FIG. 21 is a flowchart illustrating the management terminal registration and deletion process. FIG. 22 is a conceptual diagram of a management terminal registration screen. FIG. 23 illustrates a confirmation screen for group deletion. FIG. 24 is a conceptual diagram of a confirmation screen for management terminal deletion.

First, the first determiner 87 determines whether to register a management terminal by determining whether the "management terminal registration" key has been selected or the "group-by-group deletion" key or "delete" key has been selected by the administrator (step S201). In the case where the "management terminal registration" key has been selected (Yes in step S201), the screen data generator 86 transmits data of a management terminal registration screen such as that illustrated in FIG. 22 to the administrator terminal 20 via the first communicator 81.

In response to this, the administrator terminal 20 displays the management terminal registration screen such as that illustrated in FIG. 22. On the management terminal registration screen, a pull-down menu for selecting a group in which the administrator newly registers a transmission terminal 10 as his/her management terminal is displayed. On the management terminal registration screen, a plurality of input fields for inputting the terminal ID of a transmission terminal 10 (registration terminal ID) requested to be registered are displayed. When the administrator selects a desired group from the pull-down menu, inputs the terminal ID of a transmission terminal 10 in one of the registration terminal ID input fields, and presses a "register" key, the administrator terminal 20 transmits to the counterpart registration system 80 a registration request including the group ID indicating the group selected by the administrator, the terminal ID input in the input field, and the administrator ID of the administrator who has input these items of information. Accordingly, the first communicator 81 of the counterpart registration system 80 receives the registration request. The data processor 84 adds, in the group management DB 66 of the terminal management system 50, the terminal ID input on the management terminal registration screen illustrated in FIG. 22 to a column of the terminal ID of a management terminal in a record including the group ID according to the group name selected on the management terminal registration screen illustrated in FIG. 22 (step S202). Accordingly, the transmission terminal 10 can be newly registered as a management terminal.

In contrast, in the case where the process is not registration of a management terminal in step S201 described above (No in step S201), the first determiner 87 determines whether the process is to delete an already registered management terminal (step S203). In the case of deleting a management terminal (Yes in step S203), the first determiner 87 determines whether to delete a group (step S204). Specifically, the first determiner 87 determines whether the "group-by-group deletion" key or a "delete" key has been pressed on the management terminal list screen illustrated in FIG. 20. In the case where it is determined that the "group-by-group deletion" key has been pressed (Yes in step S204), the data processor 84 deletes, on the basis of a group ID indicating a group indicated in an index selected at the time the "group-by-group deletion" key has been pressed and the administrator ID used in processing in step S101 described above, a group ID associated with the administrator ID from the administrator DB 65 illustrated in FIG. 12 (step S205). For example, as illustrated in FIG. 20, in response to pressing of the "group-by-group deletion" key in a state in which the "first sales division" index has been selected on the management terminal list screen, the group ID "G001" is deleted from the administrator DB 65 illustrated in FIG. 12.

Note that, in the case where it is determined that the "group-by-group deletion" key has been pressed (Yes in step S204), before the data processor 84 deletes the above-mentioned group ID, the screen data generator 86 transmits data of a confirmation screen for group deletion, illustrated in FIG. 23, to the administrator terminal 20 which is logged in, via the first communicator 81. In response to pressing of the "OK" key by the administrator in response to this, the data processor 84 starts processing in step S205 described above. In response to pressing of the "cancel" key by the administrator, the data processor 84 does not start processing in step S205 described above, and the entire process illustrated in FIG. 21 ends. In contrast, in the case where it is determined that a "delete" key has been pressed in step S204 (No in step S204), the data processor 84 deletes, on the basis of the terminal ID of a transmission terminal 10 where the corresponding "delete" key has been pressed and a group ID associated in the administrator DB 65 with the administrator ID used in processing in step S101 described above, the terminal ID of a management terminal associated with the group ID from the administrator DB 65 illustrated in FIG. 11 (step S206). For example, as illustrated in FIG. 20, in response to pressing of a "delete" key for the transmission terminal 10 with the name "AB terminal" in a state in which the "first sales division" index has been selected on the management terminal list screen, the terminal ID "01ab" is deleted from the terminal ID of a management terminal associated with the group ID "G001" illustrated in FIG. 11.

In the case where it is determined that a "delete" key has been pressed (No in step S204), before the data processor 84 deletes the above-mentioned terminal ID, the screen data generator 86 transmits data of a confirmation screen for management terminal deletion, illustrated in FIG. 24, to the administrator terminal 20 which is logged in, via the first communicator 81. In response to pressing of the "OK" key by the administrator in response to this, the data processor 84 starts processing in step S206 described above. In response to pressing of the "cancel" key by the administrator, the data processor 84 does not start processing in step S206 described above, and the entire process illustrated in FIG. 21 ends.

(Candidate Counterpart Terminal Registration and Deletion Process)

Figure 25B:
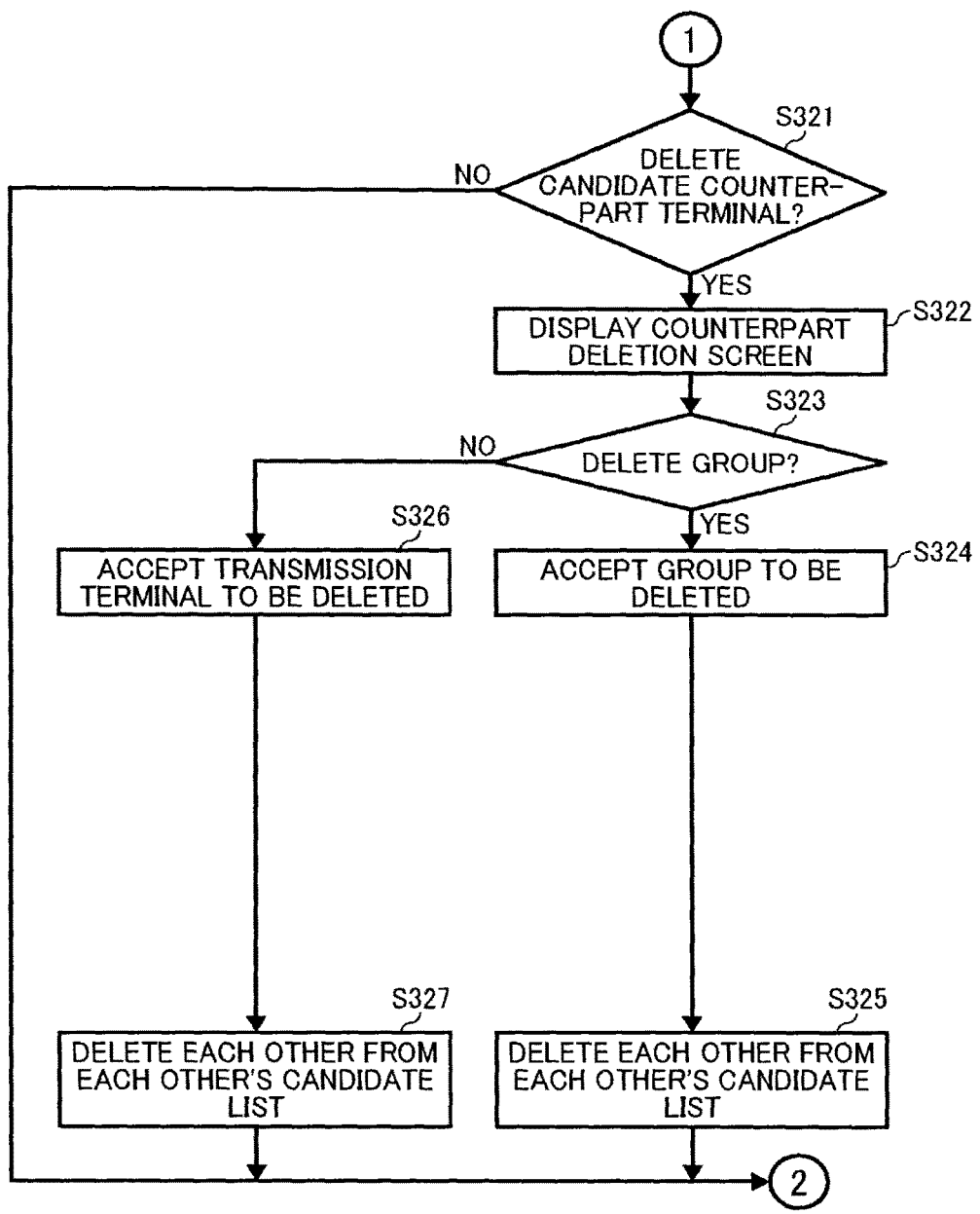

Next, using FIGS. 20, and 25 to 28, the candidate counterpart terminal registration and deletion process will be described. Here, the first to third patterns illustrated in FIGS. 14 to 16 described above will be described in more detail. Note that FIG. 25 is a flowchart illustrating a candidate counterpart terminal registration and deletion process. FIG. 26 is a conceptual diagram of a candidate counterpart terminal registration screen. FIG. 27 is a conceptual diagram of a candidate counterpart terminal deletion screen. FIG. 28 is a conceptual diagram of a counterpart terminal approval requesting screen.

The first determiner 87 specifies a request sender on the basis of request sender specifying information for specifying a request sender, sent from the administrator terminal 20a along with a candidate counterpart terminal registration request or deletion request (step S301). The request sender specifying information includes a terminal ID or a group ID. The data processor 84 generates a new record in the request management DB 64, and stores the terminal ID or group ID included in the above-described request sender specifying information to a column of "terminal ID/group ID of request sender", thereby specifying a request sender.

Specifically, the administrator A checks a check box for a specific terminal and presses the "candidate counterpart terminal registration" key on the management terminal list screen illustrated in FIG. 20, thereby identifying a request sender terminal that gives a request to register a candidate counterpart terminal for the specific terminal. For example, referring to FIG. 20, in the case where the administrator A at the administrator terminal 20a checks the check box for the terminal having the name "AA terminal" and presses the "candidate counterpart terminal registration" key on the management terminal list screen, the administrator terminal 20a transmits the group ID "G001" and the terminal ID "01aa" as request sender specifying information, along with a registration request, to the counterpart registration system 80. The first determiner 87 of the counterpart registration system 80 determines that the request sender is the transmission terminal 10aa in the group G1. In another example, in the case where the administrator A at the administrator terminal 20a presses the "candidate counterpart terminal registration" key while checking none of the check boxes on the management terminal list screen, the administrator terminal 20a transmits the group ID "G001" as request sender specifying information, along with a registration request, to the counterpart registration system 80, and the first determiner 87 determines that the request sender is the group G1. Note that, in the case where a plurality of check boxes are checked on the management terminal list screen, transmission terminals 10 whose check boxes have been checked are specified as the senders of registration requests.

In another example, a request sender is specified not only in the case of registration of a candidate counterpart terminal, but also in the case of deletion of a candidate counterpart terminal. Specifically, the administrator A at the administrator terminal 10aa checks a check box for a specific terminal and presses the "candidate counterpart terminal deletion" key on the management terminal list screen illustrated in FIG. 20, thereby identifying a request sender terminal that gives a request to delete a candidate counterpart terminal. For example, in the case where the administrator A checks the check box for the terminal 10aa having the name "AA terminal" and presses the "candidate counterpart terminal deletion" key on the management terminal list screen, the administrator terminal 20a transmits the group ID "G001" and the terminal ID "01aa" as request sender specifying information, along with a deletion request, to the counterpart registration system 80. The first determiner 87 of the counterpart registration system 80 determines that the request sender is the transmission terminal 10aa in the group G1. In another example, in the case where the administrator A presses the "candidate counterpart terminal deletion" key while checking none of the check boxes on the management terminal list screen, the administrator terminal 20a transmits the group ID "G001" as request sender specifying information, along with a deletion request, to the counterpart registration system 80, and the first determiner 87 determines that the request sender is the group G1. Note that, in the case where a plurality of check boxes are checked on the management terminal list screen, transmission terminals 10 whose check boxes have been checked are specified as the senders of deletion requests.

Next, the first determiner 87 determines whether candidate counterpart terminal registration is requested, on the basis of information sent from the administrator terminal 20a (such as a registration request or a deletion request) (step S302). In the case where the first determiner 87 determines that candidate counterpart terminal registration is requested (YES in step S302), the display control 83 transmits, via the first communicator 81, data of a candidate counterpart terminal registration screen (see FIG. 26) generated by the screen data generator 86 to the administrator terminal 20a, and the administrator terminal 20a displays the candidate counterpart terminal registration screen (step S303). As illustrated in FIG. 26, on an upper portion of the candidate counterpart terminal registration screen, a plurality of "request destination terminal ID" input fields for inputting the terminal ID of a transmission terminal 10 requested to be newly registered as a candidate counterpart terminal are displayed. On a lower portion of the candidate counterpart terminal registration screen, a plurality of "request destination group ID" input fields for inputting the group ID of a group including a plurality of transmission terminals 10 requested to be newly registered as candidate counterpart terminals are displayed. In the case where the administrator A selects a transmission terminal 10 as the target of a candidate counterpart terminal registration request, the administrator A presses the radio button on the upper portion. In the case where the administrator A selects a group as the target of a candidate counterpart terminal registration request, the administrator A presses the radio button on the lower portion. Further, on a bottom portion of the candidate counterpart terminal registration screen, a "transmit" key that is pressed when transmitting details set by the administrator A to the counterpart registration system 80, and a "cancel" key that is pressed when canceling details set by the administrator A without transmitting the details to the counterpart registration system 80, are displayed.

When the administrator A selects the radio button on the upper portion, inputs the terminal ID of a transmission terminal 10 serving as the target of a candidate counterpart terminal registration request in one of the "request destination terminal ID" input fields, and presses the "transmit" key, the administrator terminal 20a transmits a registration request for the transmission terminal 10 and the terminal ID of the transmission terminal 10 to the first communicator 81 of the counterpart registration system 80. In contrast, when the administrator A selects the radio button on the lower portion, inputs the group ID of a group serving as the target of a candidate counterpart terminal registration request in one of the "request destination group ID" input fields, and presses the "transmit" key, the administrator terminal 20a transmits a registration request for all the transmission terminals 10 in the group and the group ID of the group to the counterpart registration system 80. Further, any desired number of terminals or groups may be selected, by inputting data in more than one field.

Next, the first determiner 87 determines whether a group serves as the target of a registration request, on the basis of the target of a registration request and an ID (terminal ID or group ID) received by the first communicator 81 (step S304). In the case where the first determiner 87 determines that a group serves as the target of a registration request (YES in step S304), the group serving as the target of a registration request is accepted on the basis of the group ID received by the first communicator 81 (step S305). Accordingly, the data processor 84 stores the group ID of the group serving as the target of a registration request in a column of "terminal ID/group ID of request destination" in a record in the request management DB 64, which has been newly generated in processing in step S301 described above, thereby specifying a request destination (step S306).

Next, the first communicator 81 transmits an approval request for candidate counterpart terminal registration to the administrator terminal 20d of the administrator D (step S307). Prior to this processing, the first extractor 85 searches the administrator DB 65 by using the group ID received by the first communicator 81 as a search key, thereby reading a corresponding administrator ID ("02D" in this case) and thus specifying a registration approval requesting destination. In addition, the approval request includes the name of a request sender and the name of a request destination. The name of a request sender and the name of a request destination are names extracted by the first extractor 85 from the terminal management DB 62 or the group management DB 66 by using, as search keys, the terminal IDs or group IDs stored in each column of "terminal ID/group ID of request sender" and "terminal ID/group ID of request destination" in the request management DB 64. Accordingly, the screen data generator 86 generates data of a counterpart registration approval requesting screen such as that illustrated in FIG. 28, and the first communicator 81 transmits, in step S307 described above, this data of a counterpart registration approval requesting screen, along with an approval request for candidate counterpart terminal registration.

Next, in step S307 described above, a counterpart registration approval requesting screen, such as that illustrated in FIG. 28, is transmitted to the administrator terminal 20d for display. Note that FIG. 26 is a conceptual diagram of a counterpart terminal approval requesting screen. Here, the details of an approval request indicate that it is requested to register all the transmission terminals (10da, 10db, and 10dc) in the group G4 (second development division) under management of the administrator D as candidate counterpart terminals in a candidate list of the transmission terminal 10aa (name "AA terminal"). In addition, on a lower portion of the counterpart registration approval requesting screen, a "yes" key that is pressed when an administrator gives approval and a "no" key that is pressed when an administrator does not give approval are displayed. When the administrator D presses the "yes" key, the administrator terminal 20d transmits a response indicating approval to the first communicator 81 of the counterpart registration system 80. When the administrator D presses the "no" key, the administrator terminal 20d transmits a response indicating disapproval to the first communicator 81 of the counterpart registration system 80.

Next, the first determiner 87 determines whether the administrator D has given approval, on the basis of the details of the response received by the first communicator 81 (step S308). In the case where the first determiner 87 determines that approval has been given, the data processor 84 collectively registers the candidate counterpart terminals for the request sender and the request destination (step S309). That is, in the candidate list management DB 63, in the case where the terminal ID of a starting terminal is the terminal ID of a transmission terminal 10 that is a candidate counterpart terminal registration request sender, the terminal ID of a transmission terminal 10 that is a candidate counterpart terminal registration request destination is added and registered as the terminal ID of a candidate counterpart terminal associated with the terminal ID of the registration request sender. Further, in the candidate list management DB 63, in the case where the terminal ID of a starting terminal is the terminal ID of a transmission terminal 10 that is a candidate counterpart terminal registration request destination, the terminal ID of a transmission terminal 10 that is a candidate counterpart terminal registration request sender is added and registered as the terminal ID of a candidate counterpart terminal associated with the terminal ID of the registration request destination. In the case where the sender and destination of a candidate counterpart terminal registration request are groups, a process of adding and registering the terminal IDs of all the transmission terminals 10 in these groups as the terminal IDs of starting terminals and the terminal IDs of candidate counterpart terminals in the candidate list management DB 63 is performed.

As has been described above, when the above-described addition and registration process ends, the data processor 84 deletes, from the request management DB 64, records including the terminal IDs (or group IDs) of the request sender and the request destination in which the addition and registration process has been completed (step S310). Accordingly, a candidate counterpart terminal registration process in the case where a request destination is a group ends.

Referring back to S304, in the case where the first determiner 87 determines, in step S304 described above, that a group does not serve as the target of a registration request (a transmission terminal 10 serves the target of a registration request) (NO in step S304), the transmission terminal 10 serving as the target of a registration request is accepted on the basis of the terminal ID received by the first communicator 81 (step S311). Since the details of the processing in steps S311 to S315 illustrated in FIG. 25A are substantially the same to those of the processing in step S305 to S309 described above except for the point that the term "group" is replaced by the term "transmission terminal 10", a description thereof is omitted.

In the case where the first determiner 87 determines that, in step S302 described above, candidate counterpart terminal registration is not requested (candidate counterpart terminal deletion is requested) (NO in step S302), the first determiner 87 further determines, on the basis of information sent from the administrator terminal 20a (such as a registration request or a deletion request), whether candidate counterpart terminal deletion is requested (step S321). In the case where the first determiner 87 determines that candidate counterpart terminal deletion is not requested, the process illustrated in FIG. 25 ends. In contrast, in the case where it is determined in step S321 described above that candidate counterpart terminal deletion is requested (YES in step S321), the display control 83 transmits, via the first communicator 81, data of a candidate counterpart terminal deletion screen (see FIG. 27) generated by the screen data generator 86 to the administrator terminal 20a, and the administrator terminal 20a displays the candidate counterpart terminal deletion screen (step S322). Since the candidate counterpart terminal deletion screen illustrated in FIG. 27 has a display form that is substantially the same to that of the candidate counterpart terminal registration screen illustrated in FIG. 26 except for the point that the term "registration" is replaced by the term "deletion", a description thereof is omitted.

Next, the first determiner 87 determines whether a group serves as the target of a deletion request, on the basis of the target of a deletion request and an ID (terminal ID or group ID) received by the first communicator 81 (step S323). In the case where the first determiner 87 determines that a group serves as the target of a deletion request (YES in step S323), the group serving as the target of a deletion request is accepted on the basis of the group ID received by the first communicator 81 (step S324). Note that, in the case of deletion, as in step S306 described above, without being managed in the request management DB 64 and without obtaining approval from a request destination, the data processor 84 collectively deletes candidate counterpart terminals for the request sender and the request destination (step S325). Since the details of the deletion processing in step S325 are substantially the same as those of the processing in step S309 described above except for the point that the term "registration" is replaced by the term "deletion", a description thereof is omitted. A deletion process in the case where a group is a candidate counterpart terminal ends.

In the case where the first determiner 87 determines that, in step S323 described above, a group does not serve as the target of a deletion request (a transmission terminal 10 serves as the target of a deletion request) (NO in step S323), the transmission terminal 10 serving as the target of a deletion request is accepted on the basis of the terminal ID received by the first communicator 81 (step S326). In addition, the data processor 84 collectively deletes candidate counterpart terminals for the request sender and the request destination (step S325). Since the details of the deletion processing in step S327 are substantially the same as those of the processing in step S315 described above except for the point that the term "registration" is replaced by the term "deletion", a description thereof is omitted. A deletion process in the case where a transmission terminal 10 is a candidate counterpart terminal ends.

As has been described above, according to the embodiment, in the case where a target requested to be registered in a candidate list is a group including a plurality of transmission terminals 10, when an approval request is given on a group-by-group basis to the administrator terminal 20 of an administrator who manages that group, processing performed by a user who is a request sender or by the administrator can be simplified, thus improving operability.

Note that the transmission management system 40 is applicable to an arbitrary system as long as the system is a communication system in which transmission terminals 10 are capable of communicating with each other. For example, the transmission management system 40 is applicable to a teleconference system, a videoconference system, a sound conference system, a sound phone system (including a mobile phone system), a text chat system, or a white-board sharing system. In addition, transmission terminals 10 may be dedicated terminals for the above-described communication system or game-dedicated terminals, or may be general terminals such as personal computers, smart phones, mobile phone terminals, or tablet terminals. In addition, it is sufficient for the terminal management system 50 and the counterpart registration system 80 to be information processing apparatuses including the functional blocks illustrated by way of example in FIG. 7, and the terminal management system 50 and the counterpart registration system 80 may be dedicated server apparatuses or general terminal apparatuses.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. A transmission management system, comprising one or more processors configured to:
   receive a registration request for registering a candidate counterpart terminal as a registered terminal in a candidate list of a first transmission terminal, the candidate list of the first transmission terminal including all candidate counterpart terminals with which the first transmission terminal can initiate a communication session;
   determine whether a target of the received registration request is a second transmission terminal or a group;
   transmit, to the second transmission terminal, an approval request requesting approval to register the second transmission terminal as a candidate counterpart terminal in the candidate list of the first transmission terminal, when the target of the registration request is determined to be the second transmission terminal;
   transmit, to an administrator terminal operated by an administrator of the group, an approval request requesting approval to register all transmission terminals in the group as candidate counterpart terminals in the candidate list of the first transmission terminal, when the target of the registration request is determined to be the group;
   register the second transmission terminal as a candidate counterpart terminal in the candidate list of the first transmission terminal based on a response indicating approval for registration from the second transmission terminal;
   register all the transmission terminals in the group as candidate counterpart terminals in the candidate list of the first transmission terminal based on a response indicating approval for registration from the administrator terminal;

register the first transmission terminal as a candidate counterpart terminal in a candidate list of the second transmission terminal, when the target of the registration request is the second transmission terminal and the received response indicates approval for registration from the second transmission terminal, and register the first transmission terminal as a candidate counterpart terminal in each of candidate lists of all the transmission terminals in the group, when the target of the registration request is the group and the received response indicates approval for registration from the administrator terminal.

2. The transmission management system of claim 1, wherein the registration request is transmitted from an administrator terminal operated by an administrator who manages the first transmission terminal.

3. The transmission management system of claim 1, wherein, in response to receiving a registration request for registering a candidate counterpart terminal in each of candidate lists of all transmission terminals in a group including the first transmission terminal, the one or more processors are further configured to register the second transmission terminal as a candidate counterpart terminal in each of the candidate lists of all the transmission terminals in the group including the first transmission terminal, based on a response indicating approval for registration from the second transmission terminal, and register all the transmission terminals in the group that is the target of the registration request, as candidate counterpart terminals in each of the candidate lists of all the transmission terminals in the group including the first transmission terminal, based on a response indicating approval for registration from the administrator terminal.

4. The transmission management system of claim 3, wherein the one or more processors are further configured to register all the transmission terminals in the group including the first transmission terminal, as candidate counterpart terminals in the candidate list of the second transmission terminal, when the target of the registration request is the second transmission terminal and the received response indicates approval for registration from the second transmission terminal, and register all the transmission terminals in the group including the first transmission terminal, as candidate counterpart terminals in each of the candidate lists of all the transmission terminals in the group that is the target of the registration request, when the target of the registration request is the group and the received response indicates approval for registration from the administrator terminal.

5. A method of managing a candidate list, comprising:

receiving a registration request for registering a candidate counterpart terminal as a registered terminal in a candidate list of a first transmission terminal, the candidate list of the first transmission terminal including all candidate counterpart terminals with which the first transmission terminal can initiate a communication session;

determining whether a target of the registration request is a second transmission terminal or a group;

transmitting, to the second transmission terminal, an approval request requesting approval to register the second transmission terminal as a candidate counterpart terminal in the candidate list of the first transmission terminal, when the target of the registration request is determined to be the second transmission terminal;

transmitting, to an administrator terminal operated by an administrator of the group, an approval request requesting approval to register all transmission terminals in the group as candidate counterpart terminals in the candidate list of the first transmission terminal, when the target of the registration request is determined to be the group;

registering the second transmission terminal as a candidate counterpart terminal in the candidate list of the first transmission terminal based on a response indicating approval for registration from the second transmission terminal;

registering all the transmission terminals in the group as candidate counterpart terminals in the candidate list of the first transmission terminal based on a response indicating approval for registration from the administrator terminal;

registering the first transmission terminal as a candidate counterpart terminal in a candidate list of the second transmission terminal, when the target of the registration request is the second transmission terminal and the received response indicates approval for registration from the second transmission terminal, and registering the first transmission terminal as a candidate counterpart terminal in each of candidate lists of all the transmission terminals in the group, when the target of the registration request is the group and the received response indicates approval for registration from the administrator terminal.

6. The method of claim 5, further comprising:

receiving a registration request for registering a candidate counterpart terminal in each of candidate lists of all transmission terminals in a group including the first transmission terminal;

registering the second transmission terminal as a candidate counterpart terminal in each of the candidate lists of all the transmission terminals in the group including the first transmission terminal, based on a response indicating approval for registration from the second transmission terminal, and registering all the transmission terminals in the group that is the target of the registration request, as candidate counterpart terminals in each of the candidate lists of all the transmission terminals in the group including the first transmission terminal, based on a response indicating approval for registration from the administrator terminal.

7. The method of claim 6, further comprising:

registering all the transmission terminals in the group including the first transmission terminal, as candidate counterpart terminals in the candidate list of the second transmission terminal, when the target of the registration request is the second transmission terminal and the received response indicates approval for registration from the second transmission terminal, and registering all the transmission terminals in the group including the first transmission terminal, as candidate counterpart terminals in each of the candidate lists of all the transmission terminals in the group that is the target of the registration request, when the target of the registration request is the group and the received response indicates approval for registration from the administrator terminal.

8. The method of claim 5, wherein the registration request is received after the group has been established and prior to a request to establish the a session between the first transmission terminal and the second transmission terminal or between the first transmission terminal and the group.

9. A non-transitory recording medium which, when executed by one or more processors, cause the one or more processors to perform a method, comprising:

receiving a registration request for registering a candidate counterpart terminal as a registered terminal in a candidate list of a first transmission terminal, the candidate list of the first transmission terminal including all candidate counterpart terminals with which the first transmission terminal can initiate a communication session;

determining whether a target of the registration request is a second transmission terminal or a group;

transmitting, to the second transmission terminal, an approval request requesting approval to register the second transmission terminal as a candidate counterpart terminal in the candidate list of the first transmission terminal, when the target of the registration request is determined to be the second transmission terminal;

transmitting, to an administrator terminal operated by an administrator of the group, an approval request requesting approval to register all transmission terminals in the group as candidate counterpart terminals in the candidate list of the first transmission terminal, when the target of the registration request is determined to be the group;

registering the second transmission terminal as a candidate counterpart terminal in the candidate list of the first transmission terminal based on a response indicating approval for registration from the second transmission terminal;

registering all the transmission terminals in the group as candidate counterpart terminals in the candidate list of the first transmission terminal based on a response indicating approval for registration from the administrator terminal;

registering the first transmission terminal as a candidate counterpart terminal in a candidate list of the second transmission terminal, when the target of the registration request is the second transmission terminal and the received response indicates approval for registration from the second transmission terminal, and registering the first transmission terminal as a candidate counterpart terminal in each of candidate lists of all the transmission terminals in the group, when the target of the registration request is the group and the received response indicates approval for registration from the administrator terminal.

* * * * *